United States Patent
Sethuraman et al.

(10) Patent No.: US 11,490,096 B2
(45) Date of Patent: Nov. 1, 2022

(54) HARDWARE AND SOFTWARE FRIENDLY SYSTEM AND METHOD FOR DECODER-SIDE MOTION VECTOR REFINEMENT WITH DECODER-SIDE BI-PREDICTIVE OPTICAL FLOW BASED PER-PIXEL CORRECTION TO BI-PREDICTIVE MOTION COMPENSATION

(71) Applicant: HUAWEI TECHNOLOGIES CO., LTD., Guangdong (CN)

(72) Inventors: Sriram Sethuraman, Bangalore (IN); Jeeva Raj A, Tamil Nadu (IN); Sagar Kotecha, Maharashtra (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/308,311

(22) Filed: May 5, 2021

(65) Prior Publication Data
US 2021/0329257 A1    Oct. 21, 2021

Related U.S. Application Data

(63) Continuation of application No. PCT/CN2019/129980, filed on Dec. 30, 2019.

(30) Foreign Application Priority Data

Jan. 2, 2019  (IN) .............................. 201931000185
Jan. 10, 2019 (IN) .............................. 201931001238

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/132* (2014.11); *H04N 19/176* (2014.11); *H04N 19/513* (2014.11)

(58) Field of Classification Search
None
See application file for complete search history.

(56) References Cited

U.S. PATENT DOCUMENTS

2008/0069223 A1    3/2008  Jeon
2012/0075535 A1*   3/2012  Van Beek .............. H04N 5/145
(Continued)

FOREIGN PATENT DOCUMENTS

CN    105681805 A    6/2016
CN    108293131 A    7/2018
(Continued)

OTHER PUBLICATIONS

Akula et al., "Description of SDR, HDR and 360 video coding technology proposal considering mobile application scenario by Samsung, Huawei, GoPro, and HiSilicon," buJoint Video Exploration Team (JVE 1) of ITU-T SG 16 WP 3 and ISO/IEC JTC 1/SC 29/WG 11,Document: JVET-J0024_v2, 10th Meeting, San Diego, US, Apr. 10-20, 2018, XP030248222, total 124 pages.

(Continued)

*Primary Examiner* — Christopher G Findley
(74) *Attorney, Agent, or Firm* — Fish & Richardson P.C.

(57) ABSTRACT

Methods and system, including decoders and encoders, for interprediction. In one aspect, a method includes selecting reference samples based on motion information of a current picture block of a current picture, deriving first interpolated samples by performing a first interpolation on the selected reference samples, deriving an integer distance delta motion vector for a target sub-prediction unit (PU) by performing integer-distance MVR, deriving M×M pixel matrix flow (Continued)

Figure 1:
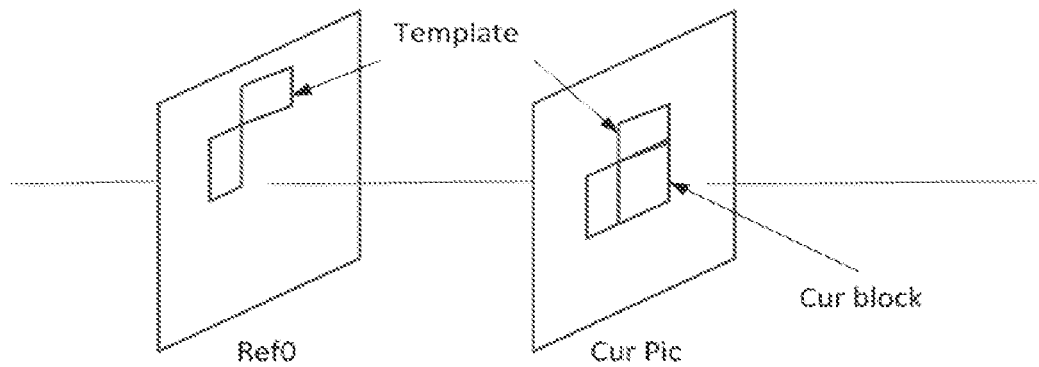

vectors by performing BPOF, for each M×M pixel matrix in the target sub-PU, based on the first interpolated samples and the integer distance delta motion vector, deriving second interpolated samples by performing a second interpolation on the reference samples, computing at least one correction parameter for the target sub-PU based on the M×M pixel matrix flow vectors, the first interpolated samples and the second interpolated samples, and performing bi-prediction based on the second interpolated samples and the at least one correction parameter.

20 Claims, 11 Drawing Sheets

(51) Int. Cl.
   *H04N 19/132* (2014.01)
   *H04N 19/176* (2014.01)
   *H04N 19/513* (2014.01)

(56) References Cited

U.S. PATENT DOCUMENTS

| | | | | |
|---|---|---|---|---|
| 2018/0192071 | A1* | 7/2018 | Chuang | H04N 19/517 |
| 2020/0221122 | A1* | 7/2020 | Ye | G06T 7/269 |
| 2020/0280735 | A1* | 9/2020 | Lim | H04N 19/176 |

FOREIGN PATENT DOCUMENTS

| | | |
|---|---|---|
| CN | 108641375 A | 10/2018 |
| JP | 2010028478 A | 2/2010 |
| WO | 2018113658 A1 | 6/2018 |
| WO | 2018130206 A1 | 7/2018 |

OTHER PUBLICATIONS

Chen et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, Document: JVET-E0052, 4th Meeting, Chengdu, CN, Oct. 15-21, 2016, 4 pages.

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, Document: JVET-G1001-v1, 7th Meeting, Torino, IT, Jul. 13-21, 2017, 50 pages.

Esenlik et al, "CE9: Summary Report on Decoder Side MV Derivation," Joint Video Exploration Team (JVET) of ITU-T SG 16 WP 3 and ISO/IEC JTC 1/SC 29/WG 11, Document: JVET-K0029_v2, 11th Meeting, Ljubljana, SI, Jul. 10-18, 2018, total 14 pages.

Extended European Search Report issued in European Application No. 19907651.4 dated Sep. 28, 2021, 9 pages.

ITU-T H.265 (Feb. 2018), "Series H: Audiovisual and Multimedia Systems Infrastructure of audiovisual services-Coding of moving video, High efficiency video coding," Telecommunication Standardization Sector of ITU, Feb. 2018, 692 pages.

PCT International search Report and Written Opinion issued in International Application No. PCT/CN2019/129980 dated Mar. 26, 2020, 11 pages.

Office Action issued in Japanese Application No. 2021-520339 dated Jun. 21, 2022, 8 pages (with English translation).

Sethuraman, "Non-CE9: Co-existence analysis for DMVR with BDOF," Joint Video Experts Team (JVET) of ITU-T SG 16 WP 3 and ISO/IEC JTC 1/SC 29/WG 11, Document: JVET-M0223-v1, 13th Meeting: Marrakech, MA, Jan. 9-18, 2019, 6 pages.

Office Action issued in Chinese Application No. 201980085193.6 dated Sep. 9, 2022, 7 pages.

\* cited by examiner

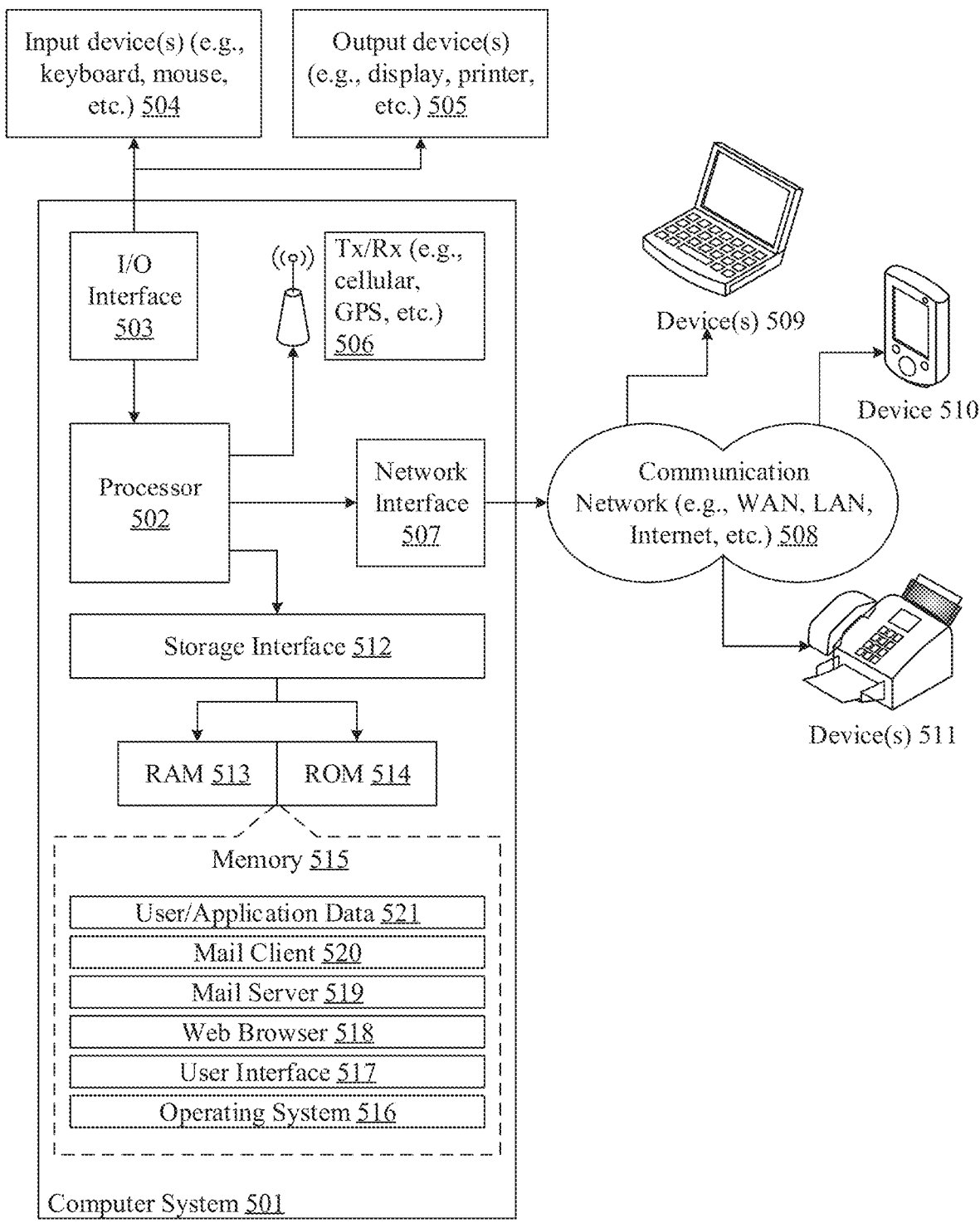
FIG. 5 Example Computer System

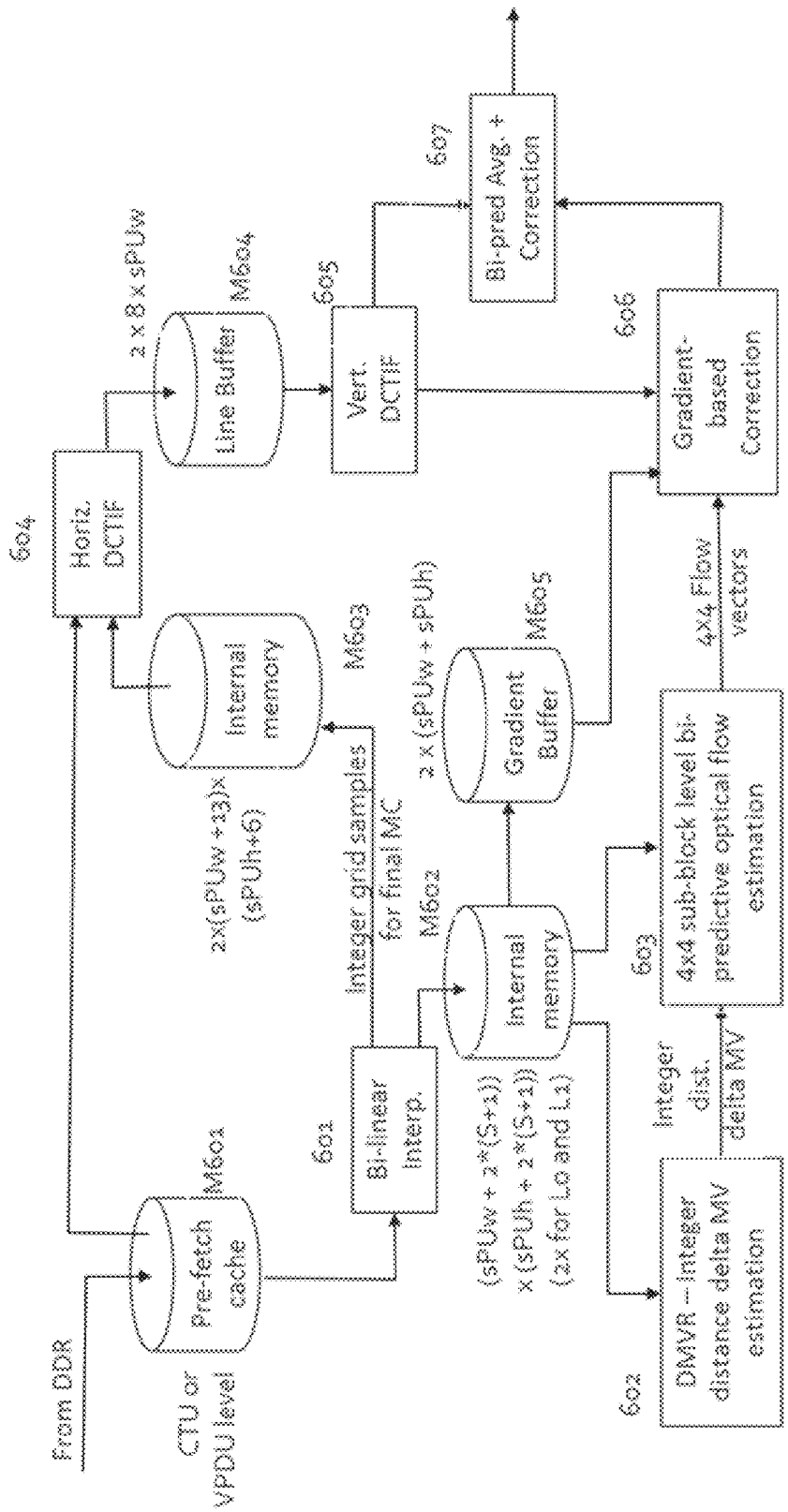
FIG. 6 DMVR + BPOF co-existence system block diagram for Embodiment-1

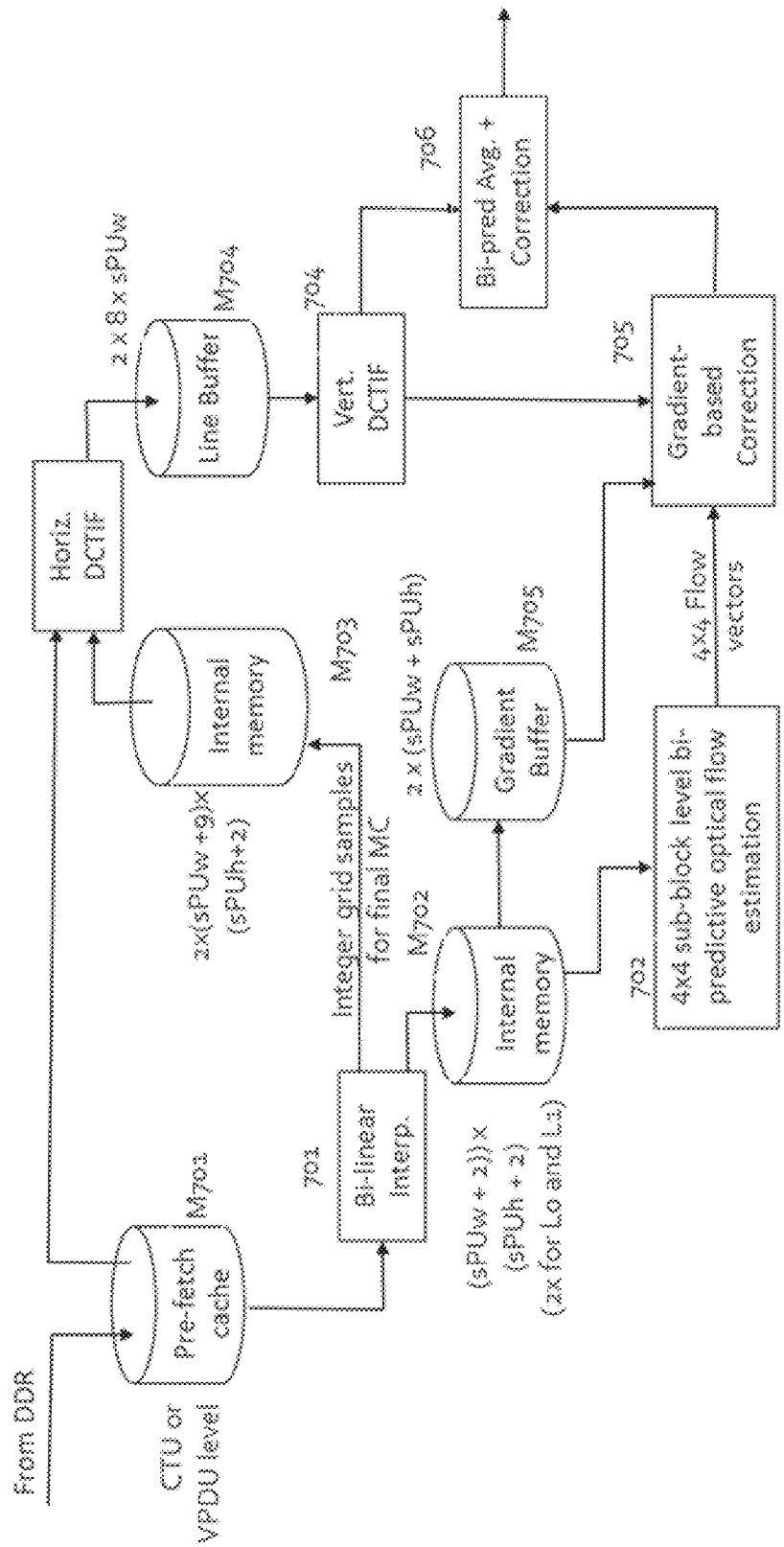
FIG. 7 BPOF system block diagram for non-DMVR CUs for Embodiment-1

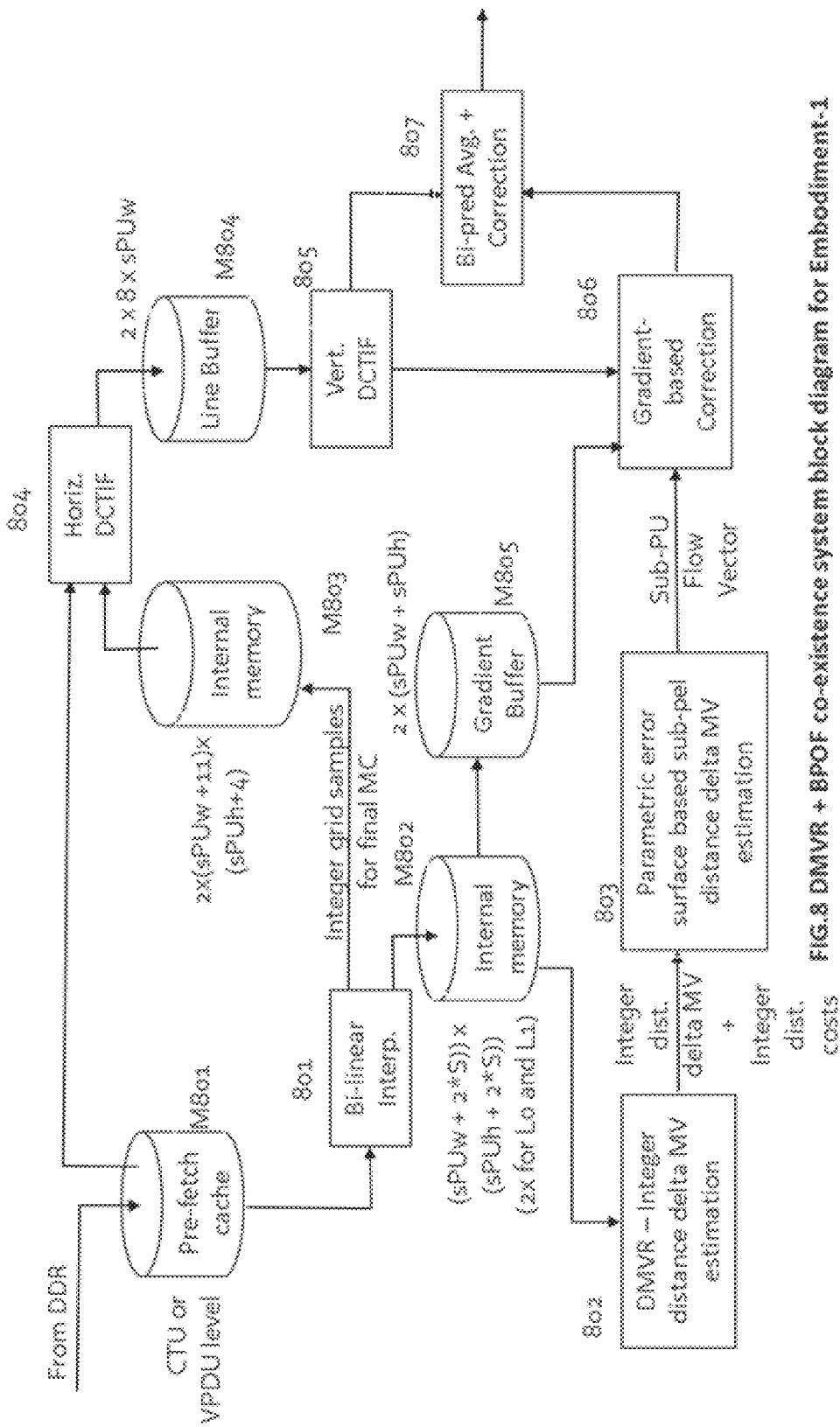
FIG. 8 DMVR + BPOF co-existence system block diagram for Embodiment-1

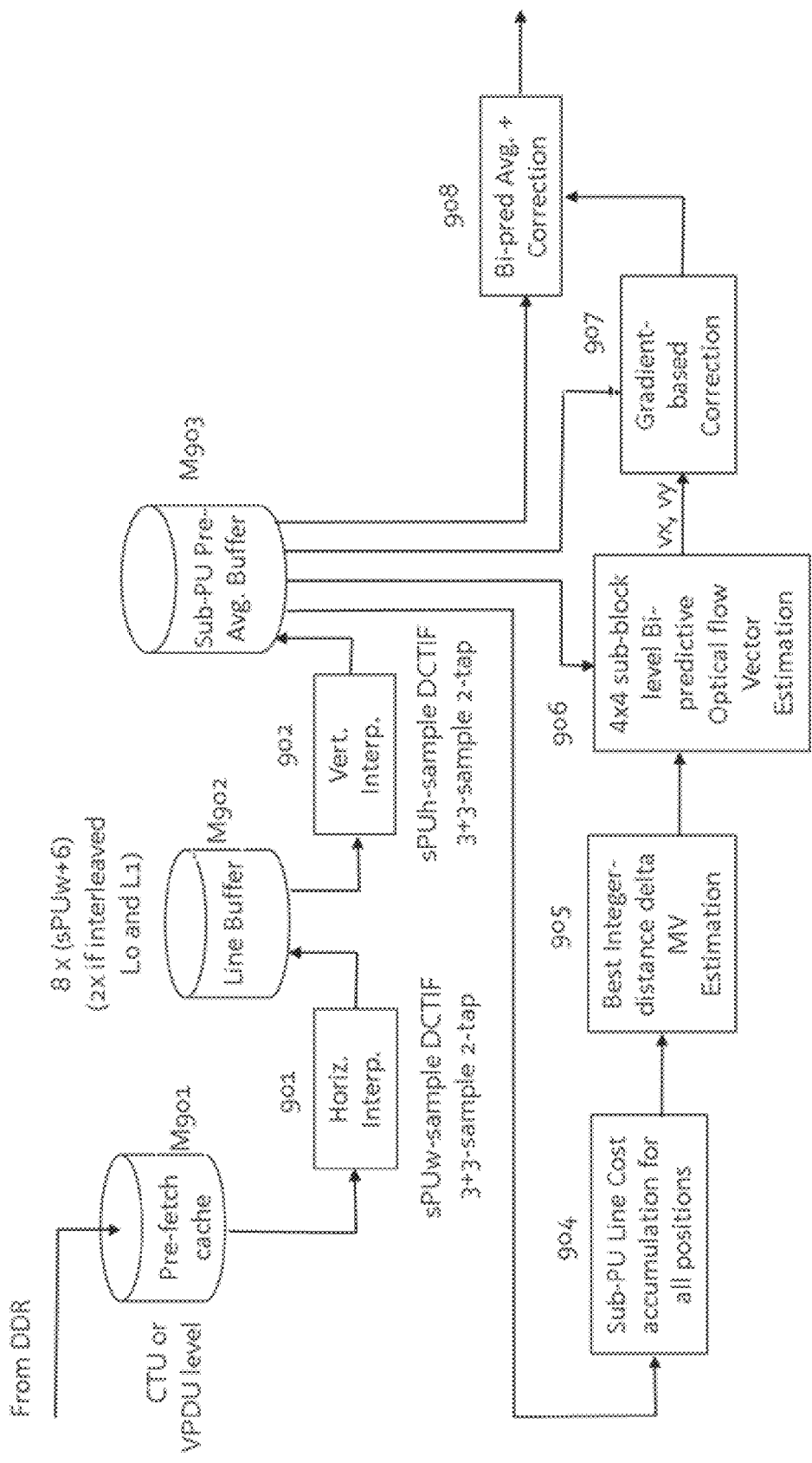
FIG. 9 DMVR + BPOF co-existence system block diagram for Embodiment-2

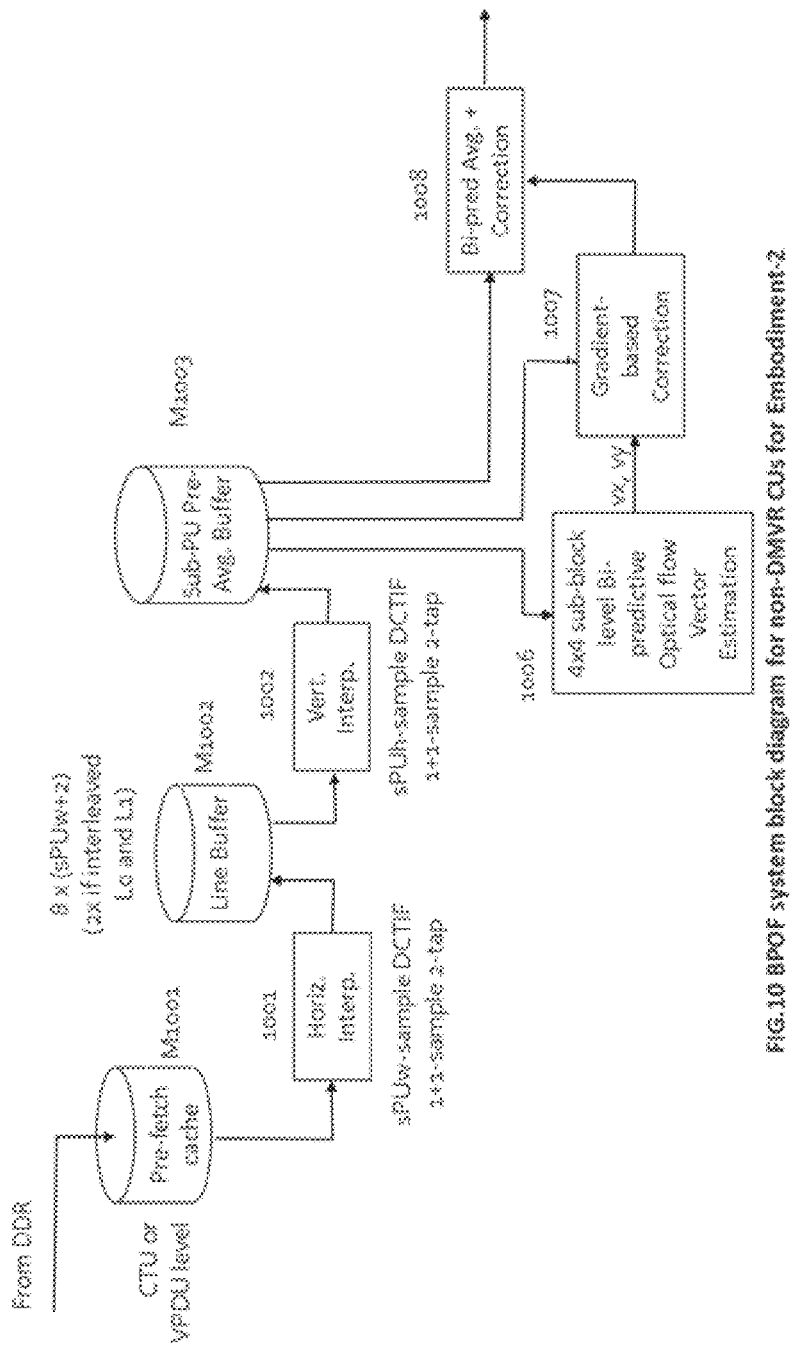
FIG. 10 BPOF system block diagram for non-DMVR CUs for Embodiment 2

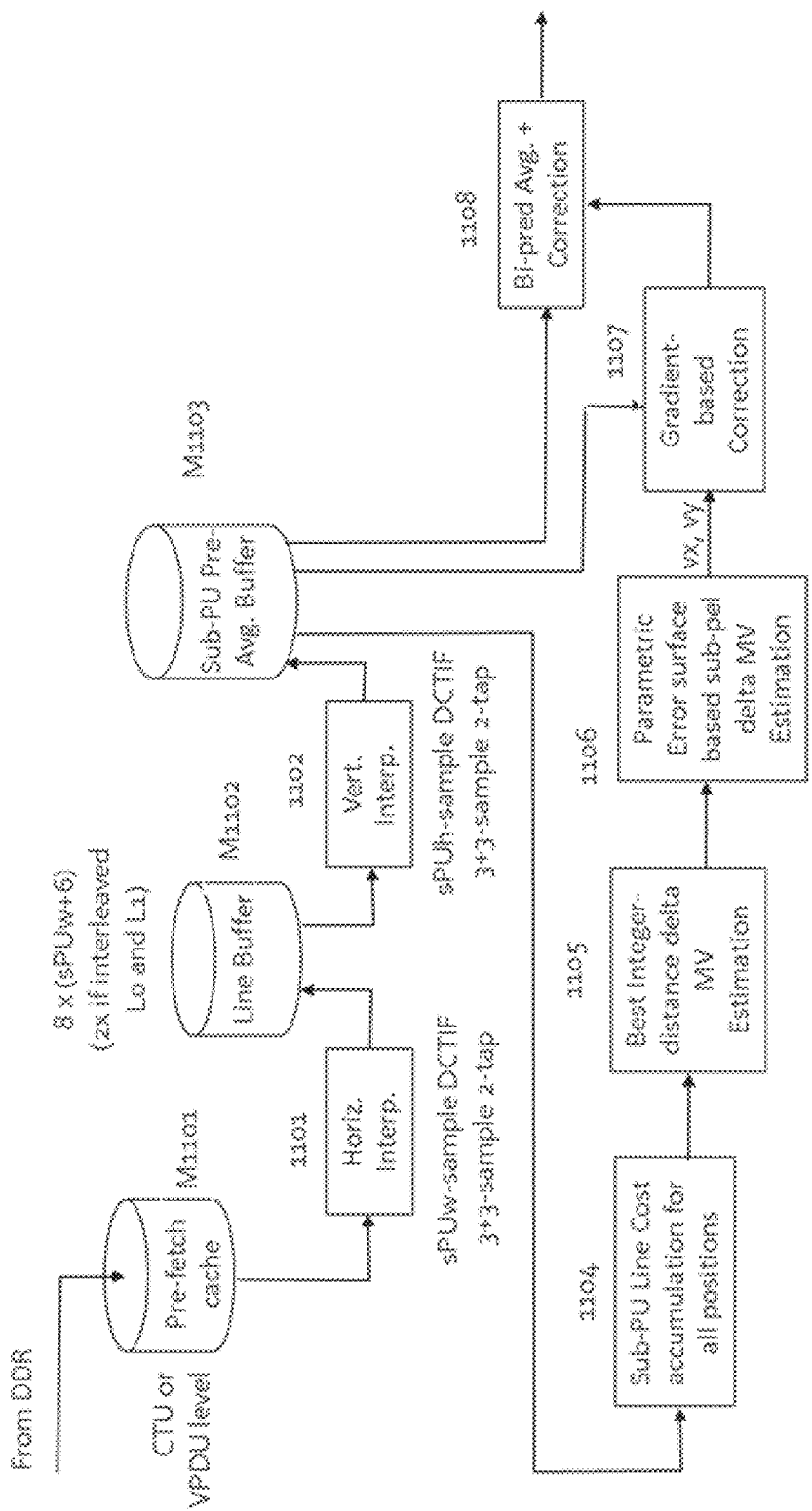
FIG. 11 DMVR with gradient based correction for sub-PU level sub-pel flow (without BPOF at 4x4 level)

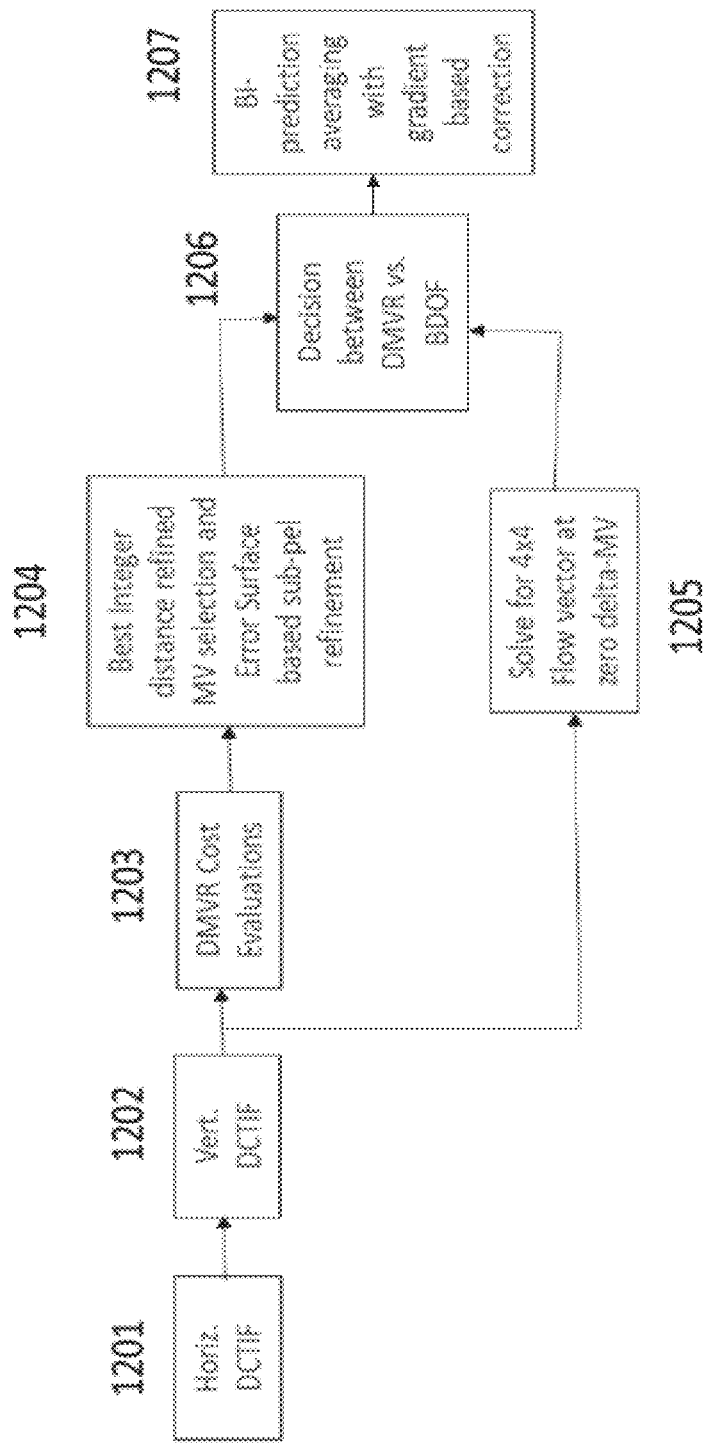
Fig. 12: Block diagram corresponding to Embodiment-3

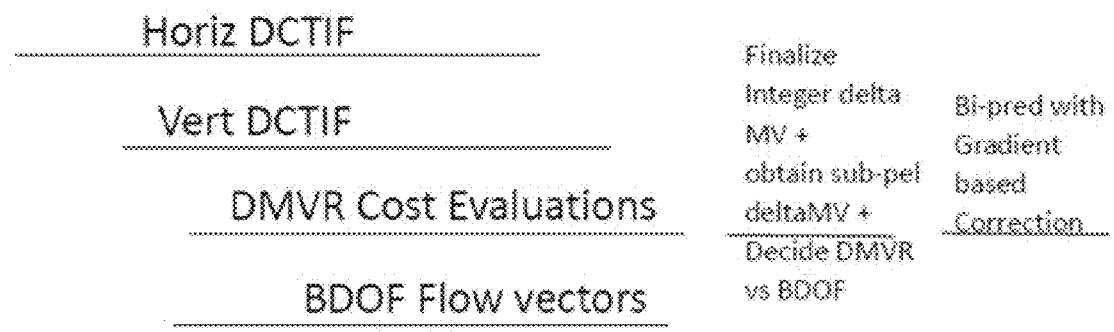
Fig. 13: Timing Diagram for Embodiment-3
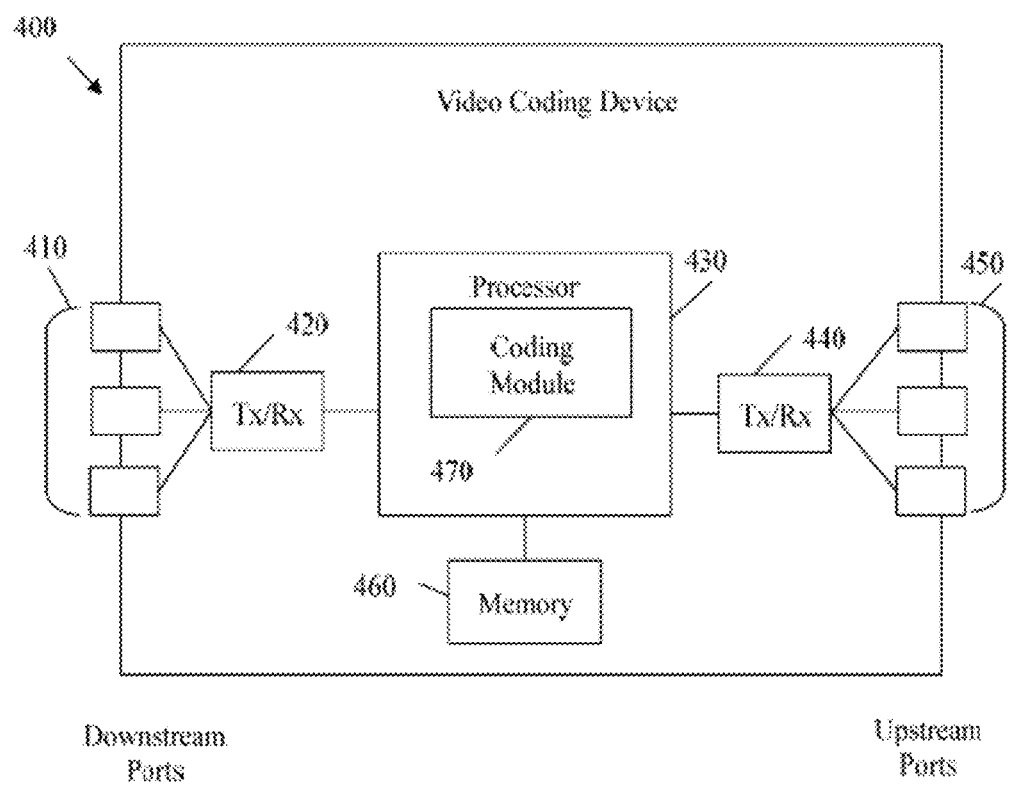
FIG. 14

HARDWARE AND SOFTWARE FRIENDLY SYSTEM AND METHOD FOR DECODER-SIDE MOTION VECTOR REFINEMENT WITH DECODER-SIDE BI-PREDICTIVE OPTICAL FLOW BASED PER-PIXEL CORRECTION TO BI-PREDICTIVE MOTION COMPENSATION

CROSS-REFERENCE TO RELATED APPLICATIONS

This application is a continuation of International Application No. PCT/CN2019/129980, filed on Dec. 30, 2019, which claims priority from India Application No. IN201931000185, filed on Jan. 2, 2019 and from India Application No. IN201931001238, filed on Jan. 10, 2019. The disclosures of the aforementioned patent applications are hereby incorporated by reference in their entireties.

TECHNICAL FIELD

The present disclosure generally relates to the field of picture processing and more particularly to inter prediction techniques.

BACKGROUND OF THE INVENTION

In video compression, inter prediction is a process of using reconstructed samples of previously decoded reference pictures by specifying motion vectors relative to a current block. These motion vectors can be coded as a prediction residual by using spatial or temporal motion vector predictors. The motion vectors can be at sub-pixel accuracy. In order to derive the sub-pixel accurate pixel values in the reference frames prediction for the current block is derived as a weighted combination of two prediction blocks derived using two motion vectors from two reference picture areas. In this case, in addition to the motion vectors, the reference indices for the reference pictures from which the two prediction blocks are derived also need to be coded. The motion vectors for the current block can also be derived through a merge process where a spatial neighbor's motion vectors and reference indices are inherited without coding any motion vector residuals. In addition to spatial neighbors, motion vectors of previously coded reference frames are also stored and used as temporal merge options with appropriate scaling of the motion vectors to take care of the distance to the reference frames relative to the distance to the reference frames for the current block.

The invention relates to versatile video coding standardization which was earlier pursued as a Joint Exploratory Model (JEM) within Joint Video Exploration Team which is a joint work between Q16 of VCEG and MPEG (SC29/WG11). Document JVET-G1001 and other prior art relating to decoder side motion vector refinement and decoder side motion vector derivation can be used to get a list of contribution documents and patents related to this invention.

Several methods have been proposed for performing a decoder-side motion vector refinement or derivation so that the motion vector residual coding bits can be further reduced.

One class of methods, called template matching (TM) methods, uses an L-shaped region adjoining the current block (as shown in FIG. 1) that has already been reconstructed, called as the template, and identifies a best matching L-shaped region (using cost functions such as the sum of absolute differences or the mean-removed sum of absolute differences) in each reference frame using a plurality of suitably scaled spatial and temporal motion vector candidates. Then, centered on the best matching candidate, further refinement is performed within a certain refinement distance around that center. On the encoder side, rate distortion optimized cost is computed to decide between uni-prediction (i.e. prediction using the best matching reference) and bi-prediction (i.e. prediction derived by averaging the top two best matching references).

Figure 2:
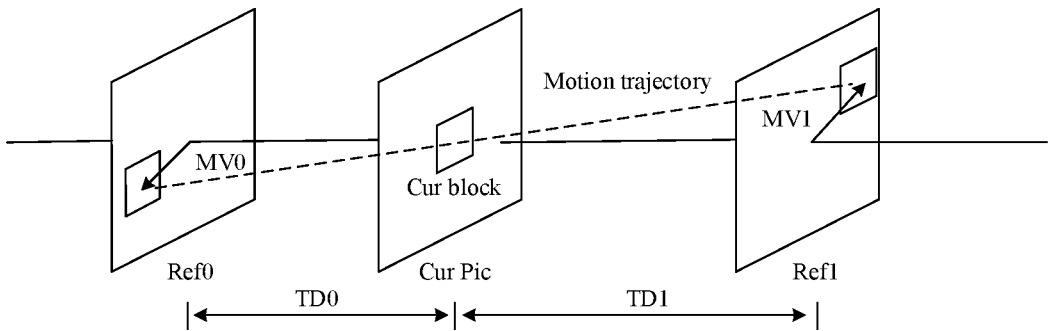

Another class of methods, called bilateral matching (BM) methods, the motion information of the current coding unit (CU) is derived on the decoder-side by taking a set of motion vector candidates and finding the closest match between the motion compensated block using a motion vector candidate and the motion compensated block obtained from another reference by symmetrically mirroring the motion vector candidate based on the temporal distance ratios (and rounding to the nearest motion vector precision used for motion compensation) between the current frame and the two reference pictures used for bi-prediction (note that the terms "picture" and "frame" are used interchangeably herein). This is shown in FIG. 2. Under the assumption of continuous motion trajectory, the motion vectors MV0 and MV1 pointing to the two reference blocks shall be proportional to the temporal distances, i.e., TD0 and TD1, between the current picture and the two reference pictures. When the current picture is temporally between the two reference pictures and the temporal distance from the current picture to the two reference pictures is the same, the bilateral matching becomes mirror based bi-directional motion compensation (MC).

After identifying the best matching motion vector candidate among a set of normative candidates, a local refinement is performed within a refinement range around the motion vector candidate in the first reference and the temporally scaled motion vector candidate based on the temporal distance ratios in the second reference in such a manner that the corresponding search positions used for cost function evaluation always are related to each other by the temporal distance ratio.

In some embodiments, in order to reduce the motion compensated interpolation complexity, bilinear interpolation is performed during refinement and final exact MC using a Discrete Cosine transform based interpolation filter (DC-TIF) is done after refinement.

In the bilateral matching merge mode, bi-prediction is always applied since the motion information of a CU is derived based on the closest match between two blocks along the motion trajectory of the current CU in two different reference pictures.

An explicit merge mode to indicate template matching merge or bilateral matching merge can be signaled to differentiate these modes from a default merge mode that does not require any decoder-side motion vector derivation.

In some embodiments, the temporal distances are ignored and bilateral matching is performed with equal and opposite motion vectors in the past and future reference frames respectively.

In some embodiments, no merge index is signaled while in other embodiments, to simplify the decoder complexity of performing multiple motion compensations, an explicit merge index is signaled.

In a variant of bilateral matching mode, a bilaterally averaged template is first created using the prediction blocks in L0 and L1 references obtained from explicitly signaled merge index and matching is performed against this template. The template is updated if there is any movement.

Also, in some embodiments, the refinement is performed in one reference and the motion vector in the other reference is obtained through mirroring of this refined motion vector. The refinement alternates between the two references until either the center position has the least error or the maximum number of iterations is reached.

In some of the methods of refinement, a CU level refinement is first performed. Then a sub-CU level multi-candidate evaluation is performed along with the CU-level refined MVs as candidates. Optionally, each sub-CU can perform its own refinement with respect to the best matching candidate.

Either the sum of absolute differences or the mean-removed sum of absolute differences is used as the matching cost function to measure the level of alignment between the L0 reference patch and the L1 reference patch. Some cost functions use a motion vector refinement distance from the start of refinement position as a bias term.

Figure 3:
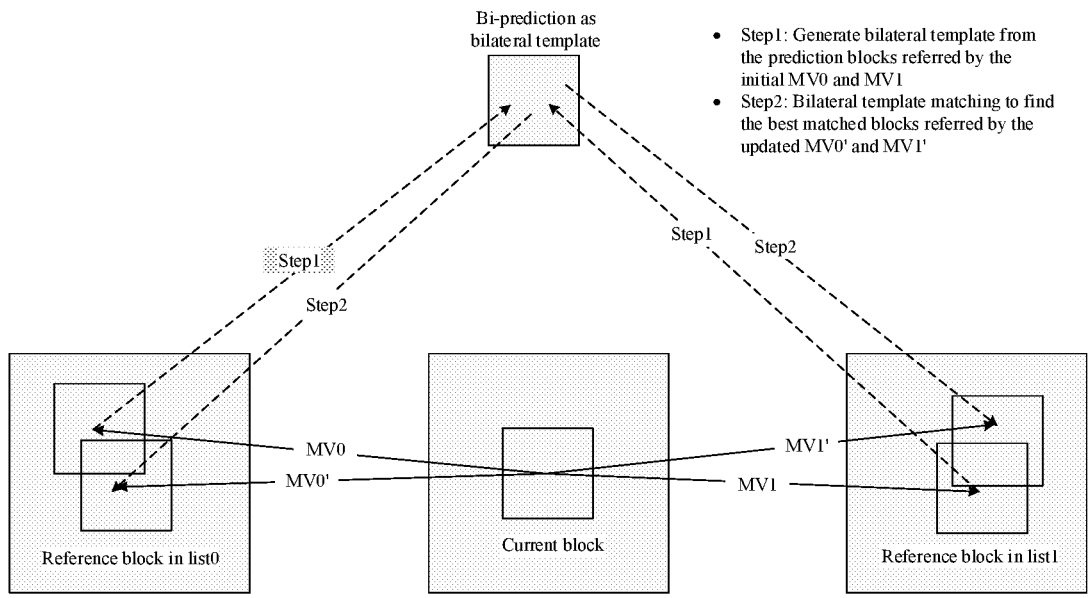

Given that the decoder-side derivation or refinement process, for example, as FIG. 3, is implicitly performed, the encoder needs to perform these steps in exactly the same manner as the decoder in order for the encoder-side reconstruction to match with the decoder-side reconstruction.

Only luma samples are typically used during the decoder side motion vector refinement or derivation process. However, chrominance is also motion compensated using the final refinement motion vectors (suitably scaled to account for any chroma downsampling) as used for luma motion compensation.

Bi-Predictive Optical Flow

Bi-predictive Optical flow (BPOF) is a sample-wise decoder-side motion refinement which is performed on top of the block-wise motion compensation for bi-prediction. The sample-level motion refinement does not use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an Eq. (1.13)

$$\partial I^{(k)}/\partial t + v_x \partial I^{(k)}/\partial x + v_y \partial I^{(k)}/\partial y = 0 \quad (1.13)$$

combining this optical flow equation with Hermite interpolation for the motion trajectory of each sample results in a unique third-order polynomial that matches both the function values $I^{(k)}$ and derivatives $\partial I^{(k)}/\partial x$, $\partial^{(k)}/\partial y$ at the ends. The value of this polynomial at t=0 is the BPOF prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)) \quad (1.14)$$

Figure 4:
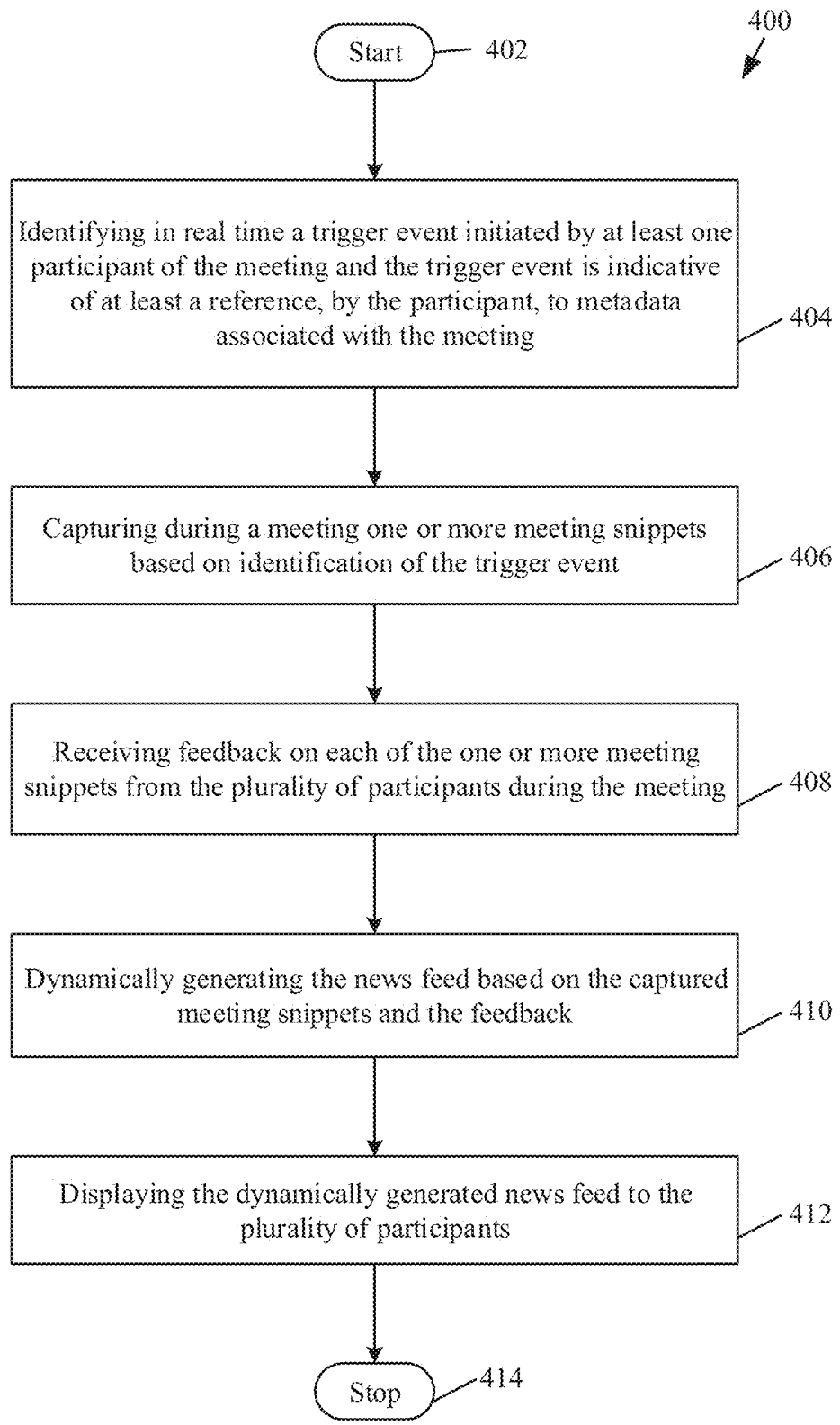

Here, $\tau_0$ and $\tau_1$ denote the distances to the reference frames as shown in FIG. 4. Distances $\tau_0$ and $\tau_1$ are calculated based on POC for Ref0 and Ref1: $\tau_0$=POC(current)−POC(Ref0), $\tau_1$, =POC(Ref1)−POC(current). If both predictions come from the same time direction (either both from the past or both from the future) then the signs are different (i.e., $\tau_0 \cdot \tau_1 < 0$). In this case, BPOF is applied only if the prediction is not from the same time moment (i.e., $\tau_0 \neq \tau_1$), both referenced regions have non-zero motion ($MVx_0, MVy_0, MVx_1, MVy_1 \neq 0$) and the block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes). Model uses only first linear term of a local Taylor expansion for $\Delta$:

$$\Delta = (I^{(0)} - I^{(1)}_0 + v_x(\tau_1 \partial I^{(1)}/\partial x + \tau_0 \partial I^{(0)}/\partial x) + v_y(\tau_1 \partial I^{(1)}/\partial y - \tau_0 \partial I^{(0)}/\partial y)) \quad (1.15)$$

All values in Eq. (1.15) depend on the sample locations (i',j'), which were omitted from the notation so far. Assuming the motion is consistent in the local surrounding area, we minimize $\Delta$ inside the (2M+1)×(2M+1) square window $\Omega$ centered on the currently predicted point (i,j), where M is equal to 2.

$$(v_x, v_y) = \arg\min_{v_x, v_y} \sum_{[i',j'] \in \Omega} \Delta^2[i', j'] \quad (1.16)$$

For this optimization problem, the current development uses a simplified least squares approach making first a minimization in the vertical direction and then in the horizontal direction. This results in $$v_x = (s_1 + r) > m\,?\,\text{clip3}\!\left(-thBPOF, thBPOF, -\frac{s_3}{(s_1 + r)}\right):0 \quad (1.17)$$

$$v_y = (s_5 + r) > m\,?\,\text{clip3}\!\left(-thBPOF, thBPOF, -\frac{s_6 - v_x s_2/2}{(s_5 + r)}\right):0 \quad (1.18)$$

where, $$s_1 = \sum_{[i',j'] \in \Omega} (\tau_1 \partial I^{(1)}/\partial x + \tau_0\, \partial I^{(0)}/\partial x)^2 \quad (1.19)$$

$$s_3 = \sum_{[i',j'] \in \Omega} (I^{(1)} - I^{(0)})(\tau_1 \partial I^{(1)}/\partial x + \tau_0 \partial I^{(0)}/\partial x)$$

$$s_2 = \sum_{[i',j'] \in \Omega} (\tau_1 \partial I^{(1)}/\partial x + \tau_0\, \partial I^{(0)}/\partial x)(\tau_1 \partial I^{(1)}/\partial y + \tau_0\, \partial I^{(0)}/\partial y)$$

$$s_5 = \sum_{[i',j'] \in \Omega} (\tau_1 \partial I^{(1)}/\partial y + \tau_0 \partial I^{(0)}/\partial y)^2$$

$$s_6 = \sum_{[i',j'] \in \Omega} (I^{(1)} - I^{(0)})(\tau_1 \partial I^{(1)}/\partial y + \tau_0 \partial I^{(0)}/\partial y)^2$$

In order to avoid division by zero or a very small value, regularization parameters r and m are introduced in Eq. (1.17) and (1.18).

$$r = 500 \cdot 4^{d-8} \quad (1.20)$$

$$m = 700 \cdot 4^{d-8} \quad (1.21)$$

Here d is bit depth of the video samples.

In certain embodiments, the division is performed using a right shift with a value computed as the position of the most significant bit position in the denominator.

With BPOF, it's possible that the motion field can be refined for each sample, but to reduce the computational complexity, a block-based design of BPOF may be used. The motion refinement is calculated based on a 4×4 block. In the block-based BPOF, the values of $s_n$ in Eq. (1.19) of all samples in a 4×4 block are aggregated, and then the aggregated values of $s_n$ are used to derived BPOF motion vector offsets for the 4×4 block. The following least squares based formula is used for block-based BPOF derivation:

$$s_{1,b_k} = \sum_{(x,y) \in b_k} \sum_{[i',j'] \in \Omega(x,y)} (\tau_1 \partial I^{(1)}/\partial x + \tau_0\, \partial I^{(0)}/\partial x)^2 \quad (1.22)$$

-continued $$s_{3,b_k} = \sum_{(x,y) \in b_k} \sum_{[i',j] \in \Omega} (I^{(1)} - I^{(0)})(\tau_1 \partial I^{(1)}/\partial x + \tau_0 \partial I^{(0)}/\partial x)$$

$$s_{2,b_k} = \sum_{(x,y) \in b_k} \sum_{[i',j] \in \Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(1)}/\partial y)$$

$$s_{5,b_k} = \sum_{(x,y) \in b_k} \sum_{[i',j] \in \Omega} (\tau_1 \partial I^{(1)}/\partial y + \tau_0 \partial I^{(0)}/\partial y)^2$$

$$s_{6,b_k} = \sum_{(x,y) \in b_k} \sum_{[i',j] \in \Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block, $s_n$ in Eq. (1.17) and (1.18) are replaced by $((s_{n,bk}) \gg 4)$ to derive the associated motion vector offsets.

In order to keep the memory access for BPOF the same as for regular bi-predictive motion compensation, all prediction and gradients values, $I^{(k)}, \partial I^{(k)}/\partial x, \partial I^{(k)}/\partial y$, are calculated only for positions inside the current block. For computing gradients of positions inside a current block that require sample values outside a current block, bilinear interpolation or the closest integer grid sample values are used in certain embodiments. In the current development, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 5.

In some cases, the MV offset computed through BPOF might be unreliable due to noise or irregular motion. Therefore, in BPOF, the magnitude of the MV offset is clipped to a threshold value thBPOF. The threshold value is determined based on whether the reference pictures of the current picture are all from one direction or not. For example, the MV offsets are typically clipped within +/−1 integer pixel distance in both horizontal and vertical directions.

In some embodiments, gradients for BPOF are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient ∂I/∂x, the signal is first interpolated vertically using BPOFfilterS corresponding to the fractional position fracY with de-scaling shift d−8, then gradient filter BPOFfillerG is applied in horizontal direction corresponding to the fractional position fracX with de-scaling shift by 18−d. In case of vertical gradient ∂I/∂y, the gradient filter is first applied vertically using BPOFfilterG corresponding to the fractional position fracY with de-scaling shift d−8, then signal displacement is performed using BPOFfilterS in horizontal direction corresponding to the fractional position fracX with de-scaling shift by 18−d. The length of interpolation filter for gradients calculation BPOFfilterG and signal displacement BPOFfilterF is shorter (6-tap) in order to maintain reasonable complexity. Table 1.4 shows the filters used for gradients calculation for different fractional positions of block motion vector in BPOF. Table 1.5 shows the interpolation filters used for prediction signal generation in BPOF.

TABLE 1.4

| Fractional pel position | Interpolation filter for gradient (BIOfilterG) |
|---|---|
| 0 | {8, −39, −3, 46, −17, 5} |
| 0/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

| Fractional pel position | Interpolation filter for prediction (BIOfilterS) |
|---|---|
| 0 | {0, 0, 64, 0, 0, 0} |
| 0/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In certain other embodiments, the gradient is computed after the 2-D separable motion compensated interpolation in the horizontal and vertical directions using a simple [−1 0 1] filter.

In the current development. BPOF is applied to all bi-predicted modes (except affine, weighted bi-predictive motion compensated, and sub-block based advanced temporal merge mode cases) when the two predictions are from different reference pictures.

For a 4×4 sub-block and using 6×6 sample positions, the equations in 1.22 will require the following intermediate precisions:

$I^{(k)}$ correspond to the unclipped predicted block samples after 2-D separable motion compensated interpolation based on the fractional part of the motion vector maintained at an intermediate bit-depth of 14 (in VVC) and with an offset of −8192 applied to utilize the dynamic range of the signed 14-bit number better. Hence, the difference term ($I^{(1)} - I^{(0)}$) will have 15-bit precision.

$\partial I^{(k)}/\partial x$ and $\partial I^{(k)}/\partial y$ correspond to the horizontal and vertical gradients computed from $I^{(k)}$ by applying a [−1 0 1] filter in the horizontal and vertical directions respectively, and hence will be at 15-bit precision.

In the current adoption, the temporal distances to the two reference frames from the current frame, $\tau_0$ and $\tau_1$, are assumed to be equal. The sum of $\partial I^{(0)}/\partial x$ and $\partial I^{(1)}/\partial x$, and the sum of $\partial I^{(0)}/\partial y$ and $\partial I^{(1)}/\partial y$ which are used in Eq.1.22 will be in 16-bit precision.

Hence, the product terms can have (16+15) or (16+16) bit precision and the accumulation over 6×6 sample positions for a given 4×4 sub-block will require a 32+6=38 bit accumulators.

In recent adoption to Versatile Video Coding standard, the following normative simplifications to intermediate bit-depth were done in order to avoid exceeding 32-bit accumulators and also to facilitate 16-bit or 32-bit single-instruction multiple data (SIMD) operations:

$I^{(1)}$ are right shifted by 6 bits before their subtraction and the subtracted quantity will be at 9-bits precision $\partial I^{(k)}/\partial x$ and $\partial I^{(k)}/\partial y$ are right shifted by 4 bits first to bring them to 1-bit precision.

The sum of horizontal gradients and sum of vertical gradients terms are computed using the 11-bit precision gradients and the computed sums are further right shifted by 3 bits to make the summed terms be at 9-bit precision.

The product terms are then computed as 9-bit×9-bit multiplications yielding 18-bit output that are accumulated into a 24-bit accumulator.

The 24-bit accumulated quantities are then used for computing the flow vector (again without exceeding a 27-bit intermediate value) and the flow vector $(v_x, v_y)$ is represented in 5-bits (i.e. each component is a value between −8 and 8).

While applying the BPOF correction at a pixel level, the intermediate 11-bit horizontal and vertical gradient values are used to obtain the 12-bit difference of the horizontal gradients and the difference of the vertical gradients which are then multiplied respectively by the $v_x$ and $v_y$, added together (which can cross 16-bit range) and then down-shifted by 1 with rounding, and then added to unclipped predicted block values with the offset term. Thus, in SIMD in software, the operations are performed in 32-bit precision till the final right shifting to bring them to the sample bit-depth and then the samples are packed. Thus, the SIMD throughput during the application of correction is poor. Currently. BPOF is disabled during weighted bi-prediction and enabled only during regular bi-predictive averaging.

Typically, the motion vectors are not updated in the case of BPOF with the estimated displacements and the chroma component predictions are not adjusted based on the estimated displacements.

Combination of DMVR and BPOF:

Since the internal memory requirements for refinement depend directly on the size of the block on which refinement is performed, certain DMVR embodiments force partition coding units of size larger than a pixel count into sub-prediction-units (sub-PUs) that do not exceed a certain pre-determined refinement_sub_PU_width and a certain pre-determined refinement_sub_PU_height.

A straight-forward combination of DMVR (whereas here and in the following the term DMVR is used, it goes without saying the encoder side motion vector refinement is also comprised) with BPOF is achieved by first performing integer-distance or sub-pixel distance accurate decoder-side MV refinement at a sub-PU level, wherein the sub-PU DMVR is performed using a simpler separable 2-D interpolation (e.g. integer-grid samples, bilinear interpolation at a specified sub-pixel accuracy that may be at the same sub-pixel accuracy as final motion compensated interpolation or at a reduced sub-pixel accuracy). Once the refined motion vector is known for the sub-PU, 2-D separable DCTIF based motion-compensated interpolation is performed. In HEVC and draft VVC standards, 8 or 7-tap DCTIF is employed for luminance MC depending on the sub-pixel phase. After the DCTIF interpolated samples from the vertical interpolation (which follows the horizontal interpolation normatively) become available, sample values and sample gradients are computed using which the bi-predictive optical flow vector is determined either at a per-pixel level or at a m×n sub-block with the sub-PU as described earlier. Based on this optical flow vector for the pixel or sub-block and the sample values and sample gradients, the conventional bi-predictive averaging is updated with a correction term as described earlier.

Hence, the start of the DCTIF based interpolation for a sub-PU has to wait for the sub-PU DMVR to be completed. The start of the computation of optical flow vector has to wait for the sub-PU DCTIF vertical interpolation to start becoming available, which is possible only after DCTIF filter-tap number of horizontally DCTIF based interpolated rows are produced.

In view of the above, it is an object underlying the present disclosure to provide techniques for inter prediction wherein the overall processing time and load and need for memory capacities can be reduced as compared to the art.

SUMMARY OF THE INVENTION

The above-mentioned object is addressed by the appended claims. It is provided an inter prediction method, comprising selecting reference samples based on motion information of a current picture block of a current picture, deriving first interpolated samples by performing a first interpolation on the selected reference samples, deriving an integer distance delta motion vector for a target sub-prediction unit, PU, by performing integer-distance Motion Vector Refinement, MVR, based on the first interpolated samples, wherein the target sub-PU is in the current picture block, deriving M×M pixel matrix flow vectors (M being an integer, for example, M=4) by performing Bi-Predictive Optical Flow, BPOF, for each M×M pixel matrix in the target sub-PU based on the first interpolated samples and the integer distance delta motion vector, wherein M is a positive integer, and the size of M×M pixel matrix is smaller than the size of the target sub-PU, deriving second interpolated samples by performing a second interpolation on the reference samples, computing at least one correction parameter for the target sub-PU based on the M×M pixel matrix flow vectors, the first interpolated samples and the second interpolated samples, and performing bi-prediction based on the second interpolated samples and the at least one correction parameter.

By the thus specified combination of derivation, computation and bi-prediction method steps the overall computational load and computational time needed for coding based on inter prediction can be significantly reduced as compared the techniques know in the art.

The motion information may comprise a motion vector at a coding tree block level or a virtual pipeline data unit level. Moreover, the motion information may comprise reference indices that are useful to facilitate the selection of the appropriate reference picture.

The second interpolation of the inventive method may be performed using a motion vector of the current picture block and the integer distance delta motion vector derived for the target sub-PU. The motion vector of a sub-block is derived based on an initial motion vector of the current block and an appropriate offset. The initial MV may not point at an integer pixel location but the offset will be an inter distance delta such that when the offset is added to the initial motion vector one arrives at an integer pixel position.

The above-mentioned at least one correction parameter for the target sub-PU used for the bi-directive prediction may by computed from sample gradients calculated for samples of the target sub-PU. Thereby, conventional bi-prediction, for example, based on template or bilateral matching only may be improved with respect to the accurateness of the prediction picture.

Particularly, the bi-prediction employing the correction parameter may comprise generating a first prediction picture using the correction parameter based on a first reference picture L0 and generating a second prediction picture using the correction parameter based on a second reference picture L1.

According to an embodiment, the integer grid samples of the reference samples are stored in a first memory, and the first interpolated samples are stored in a second memory that is different from the first memory, for example, a cache memory, such that the first interpolated samples can be readily retrieved in different processing steps where it is needed.

In the above-described embodiments, the second interpolation may performed by a separable interpolation filter. Such kind of filters may allow for a relatively fast and accurate interpolation.

In the above-described embodiments the inventive method, before computing the at least one correction parameter for the target sub-PU, may comprise: deriving horizontal boundary sample gradients at the left and right boundary sample positions of the target sub-PU and vertical boundary sample gradients at the top and bottom boundary sample positions of the target sub-PU based on the first interpolated samples.

The horizontal and vertical boundary sample gradients can be buffered in some internal memory in order to be used during gradient-based correction of bi-prediction. The at least one correction parameter for the target sub-PU may be computed based on the horizontal boundary sample gradients and the vertical boundary sample gradients. Particularly, the horizontal boundary sample gradients and the vertical boundary sample gradients may be derived after performing the motion vector refinement in order to reduce the overall memory and computational load.

The above-mentioned first interpolation may be a bilinear interpolation and/or the above-mentioned second interpolation may be a less simple/costly Discrete Cosine transform interpolation.

The above-mentioned object is also addressed by providing an inter prediction method, comprising: selecting reference samples based on motion information of a current picture block of a current picture, deriving interpolated samples by performing an interpolation (for example, performed by a separable interpolation filter) on the selected reference samples, calculating integer-distance Motion Vector Refinement, MVR, costs based on the interpolated samples, determining an integer distance delta motion vector based on the calculated integer-distance MVR costs, deriving M×M pixel matrix flow vectors (M being an integer, for example, M=4) by performing Bi-Predictive Optical Flow, BPOF, for each M×M pixel matrix in a target sub-prediction unit, PU, based on the interpolated samples and the integer distance delta motion vector, wherein M is a positive integer, and M×M is smaller than the size of sub PU and wherein the target sub-PU is in the current picture block, computing at least one correction parameter for the target sub-PU based on the M×M pixel matrix flow vectors and the interpolated samples, and performing bi-prediction based on the interpolated samples and the at least one correction parameter.

By the thus specified combination of derivation, computation and bi-prediction method steps the overall computational load and computational time needed for coding based on inter prediction can also be significantly reduced as compared the techniques know in the art.

As in the previously described embodiments, the motion information may comprise a motion vector at a coding tree block level or a virtual pipeline data unit level and it may comprise reference indices.

The at least one correction parameter for the target sub-PU may be computed from sample gradients calculated for samples of the target sub-PU. As in the previously described embodiments, the performing of the bi-prediction may comprise generating a first prediction picture using the correction parameter based on a first reference picture L0 and generating a second prediction picture using the correction parameter based on a second reference picture L1.

The correction parameter for the target sub-PU may be computed based on the boundary gradients. Thus, the method may comprise, before computing the at least one correction parameter for the target sub-PU, deriving boundary gradients of the target sub-PU based on the interpolated samples before computing the at least one correction parameter for the target sub-PU.

The interpolation used in this provided method may be a bilinear interpolation or a Discrete Cosine transform interpolation. Moreover, first and last N rows of the interpolation samples may be determined using a same first interpolation method, and the rows of the interpolation samples, except for the first and last N rows, may be determined using a same second interpolation method. N may be 3, for example. The first interpolation method may be a Discrete Cosine transform interpolation or bilinear interpolation and the second interpolation may be a Discrete Cosine transform interpolation.

The above-mentioned object is also addressed by providing another inter prediction method, comprising the steps of selecting reference samples by motion information of a current picture block of a current picture, deriving interpolated samples for a target sub-prediction unit, PU, of the current picture block by performing a first interpolation on such reference samples of the selected reference samples the positions of which correspond to the zero delta-motion vector, MV, in the MV refinement range for the current picture block, and by performing a second interpolation on such reference samples of the selected reference samples the positions of which do not correspond to the zero delta MV in the MV refinement range for the current picture block, calculating integer-distance Motion Vector Refinement, MVR, costs based on the interpolated samples, determining an integer distance delta motion vector based on the calculated integer-distance MVR costs, determining a sub-pixel accurate delta motion vector around the determined integer distance delta motion vector using the calculated integer-distance MVR costs, deriving M×M pixel matrix flow vectors (M being an integer, for example, M=4) by performing Bi-Predictive Optical Flow. BPOF, for each M×M luma block of samples in the target sub-PU based on the interpolated samples at the zero delta motion vector position, wherein M is a positive integer, and M×M is smaller than the size of sub-PU, and wherein the target sub-PU is in the current picture block, determining whether luma inter prediction for the target sub-PU is performed using the determined delta motion vector for the target sub-PU or the derived BPOF vectors for each M×M luma block of samples in the target sub-PU, computing at least one correction parameter for the target sub-PU based on the M×M pixel matrix flow vectors and the interpolated samples in the event that the luma inter prediction for a target sub-PU is determined to be performed using the derived BPOF vectors, computing at least one correction parameter for the target sub-PU based on the determined delta motion vector in the event that the luma inter prediction for a target sub-PU is determined to be performed using the determined delta motion vector, and performing bi-prediction based on the interpolated samples and the at least one correction parameter.

By the thus specified combination of derivation, computation and bi-prediction method steps of tis other provided method the overall computational load and computational time needed for coding based on inter prediction can also be significantly reduced as compared the techniques know in the art.

In this other provided method also, the at least one correction parameter for the target sub-PU may be computed from sample gradients calculated for samples of the target sub-PU. Again, the performing of the bi-prediction may comprise generating a first prediction picture using the correction parameter based on a first reference picture L0 and generating a second prediction picture using the correction parameter based on a second reference picture L1.

The second interpolation may be performed by a separable interpolation filter and/or the first interpolation may be a Discrete Cosine Transform interpolation. The second interpolation may be bilinear or Discrete Cosine Transform interpolation.

This other provided method conditionally performs luma inter prediction for the target sub-PU using delta motion vector for the target sub-PU or BPOF vectors for each M×M luma block of samples in the target sub-PU. Thereby, the concrete inter prediction might be chosen based on a compromise between computational load/overhead and accuracy of the prediction picture resulting from the inter prediction procedure. Experiments and experience won during practical applications have shown that it might be suitable to perform the luma inter prediction for the target sub-PU using the derived BPOF vectors for each M×M luma block of samples in the target sub-PU when particular condition hold. For example, it might be determined that the luma inter prediction for the target sub-PU is performed using the derived BPOF vectors for each M×M luma block of samples in the target sub-PU, when on or more of the following conditions are satisfied: a) the best cost integer distance delta motion vector is a zero vector; b) the zero delta motion vector MVR cost minus the best cost is less than a predetermined threshold; and c) the variance of the Euclidean or Manhattan distance of BPOF vectors across all 4×4 blocks of luma samples within in a target sub-PU exceed a pre-determined threshold.

All of the above-described embodiments of the inventive methods can be used for coding, i.e., encoding and decoding, of video pictures of video sequences. Thus, the following methods are also provided herein:

A method of encoding video pictures comprising receiving the video pictures, applying the inter prediction method of any of the above-described embodiments to blocks of the video pictures and encoding the video pictures based on the performed bi-prediction and a method of decoding encoded video pictures comprising receiving the encoded video pictures, applying the inter prediction method of any of the above-described embodiments to blocks of the encoded video pictures and decoding the encoded video pictures based on the performed bi-prediction.

Furthermore, an encoder or a decoder comprising processing circuitry for carrying out the method according to any of the above-described embodiments is provided.

Particularly, it is provided an encoder or decoder, comprising one or more processors and a non-transitory computer-readable storage medium coupled to the processors and storing programming for execution by the processors, wherein the programming, when executed by the processors, configures the encoder or decoder to carry out the method according to any of the above-described embodiments.

Moreover, a computer program product comprising a program code for performing the method according to any of the above-described embodiments is provided.

BRIEF DESCRIPTION OF ACCOMPANYING DRAWINGS

FIG. 1: Illustration of template matching based Decoder Side Motion Vector Derivation FIG. 2: Illustration of bilateral matching based Decoder Side Motion Vector Derivation FIG. 3: Illustration of bilateral template matching based Decoder Side Motion Vector Refinement FIG. 4: Illustration of bi-predictive Optical Flow FIG. 5: Illustration of deriving sample values and sample gradient values outside the current block FIG. 6: DMVR+BPOF co-existence system block diagram for embodiment 1

FIG. 7: BPOF system block diagram for non-DMVR CUs for embodiment 1

FIG. 8: DMVR+BPOF co-existence system block diagram for embodiment 1

FIG. 9: DMVR+BPOF co-existence system block diagram for embodiment 2

FIG. 10: BPOF system block diagram for non-DMVR CUs for embodiment 2

FIG. 11: Illustration of DMVR with gradient based correction for sub-PU level sub-pelflow (without BPOF at 4×4 level)

FIG. 12: Block diagram for embodiment 3

FIG. 13: Timing diagram for embodiment 3

FIG. 14: Illustration of an embodiment of an encoder or decoder.

DETAILED DESCRIPTION OF THE INVENTION

As described above, a straight-forward combination of decoder-side motion vector refinement (say, using symmetric bilateral matching) and decoder-side bi-predictive optical flow based per-pixel correction to each bi-predictively motion compensated sample involves a dependency between sub-PU level determination of integer distance or integer with sub-pixel distance refinement motion vector and start of horizontal DCTIF based interpolation. Similarly, the start of bi-predictive optical flow estimation has a dependency on the first vertical DCTIF based interpolated row to become available. The first dependency can be addressed by setting up a sub-PU granularity pipeline such that when DMVR (it is again noted that by DMVR motion vector refinement at the encoder side is also comprised) works on a given sub-PU, DCTIF can be performed on an earlier sub-PU for which DMVR has already completed (or has been determined to be not applicable).

Given that there can be considerable overlap between the samples required for motion compensation of different prediction or coding unit blocks that are adjacent to each other, a pre-fetch cache is typically employed in hardware designs to deterministically bring the samples required for motion compensation. In software implementations, the processor caches automatically provide spatial locality of reference. These pre-fetch caches tend to be faster to access than external memory, but slower to access than internal line memories used in hardware designs. Hence, it is preferable for this pre-fetch cache to not be accessed many times for the same set of samples. Hence, with a sub-PU level pipeline, the internal memory requirements increase to buffer up the integer-grid samples for eventual DCTIF to avoid accessing the pre-fetch cache again for lines that were already accessed for DMVR. With DMVR and horizontal DCTIF based interpolation working on different sub-PUs, the internal memory need becomes 4*(sPUw+N_TAPS_DCTIF−1+2*(S+1))*(sPUh+2*(S+1)) across the two references and two sub-PUs, wherein sPUw and sPUh are the width and height of a sub-PU (of the chosen granularity), N_TAPS_DCTIF indicates the number of filter taps used for DCTIF based interpolation, and S represents the DMVR refinement range around the merge motion vector, and the additional 1 comes from the needs of BPOF.

As N_TAPS_DCTIF increases, given that horizontal DCTIF based interpolation needs to be normatively performed before vertical DCTIF based interpolation, vertical DCTIF based interpolation cannot start till N_TAPS_DCTIF number of horizontal DCTIF based interpolated rows are produced. It is preferable from an overall timing (or latency of the pipeline) point of view to perform certain calculations of BPOF during this time, which is currently not possible as BPOF is performed on vertical DCTIF based interpolated samples. Given the gradient computation requirement in the vertical direction, 3 vertically interpolated rows are required for vertical gradient computation to start. Given the sub-PU level pipeline, in order to keep the internal memory minimal. BPOF also needs to happen at a sub-PU level. Determination of flow vector for 4×4 sub-blocks of a sub-PU require 5*(sPUw+2)*(sPUh+2) 9-bit×9-bit multiplications. The number of product term accumulations will be NUM_4× 4_PER_SUB_PU*36, where NUM_4×4_PER_SUB_PU is the number of 4×4 blocks per sub-PU. Since the computation of the correction term requires the horizontal and vertical gradients, it is imperative that either the horizontal and vertical sample gradients of L0 and L1 (at 15 bits depth) are stored in a buffer or the unclipped pre-average interpolated samples at intermediate bit-depth (of 14) are stored in a buffer till correction computation can start with the availability of the 4×4 level computed flow vector. For best timing, while optical flow estimation for a row of 4×4 blocks within a sub-PU happens, flow vector and gradient based correction will be computed for a previous row of 4×4 blocks within the sub-PU. This implies that the gradient storage or unclipped pre-average interpolated sample storage will have to be for at least 8 rows in each reference. It should be noted that in the absence of BPOF, the bi-predictive averaging could have been performed on a row by row basis as soon as one row of vertically interpolated samples from each reference become available. Hence, it is desirable to reduce the internal memory load.

BPOF in the absence of DMVR currently assumes that within a coding unit, DCTIF based interpolated samples are available outside a given 4×4 as long as these additional samples fall within the coding unit. In other words, for the gradient calculation for positions inside the 4×4, DCTIF based interpolated samples in 6×6 are required. Similarly, for a sub-PU, DCTIF based interpolated samples in (sPUw+2)×(sPUh+2) are required. This would either require DCTIF to prime the sub-PU pipeline by initially producing 2 rows and 2 columns whenever coding unit size is larger than the sub-PU size. This also increases the internal memory requirement as 2*128*2*2 pre-average interpolated reference samples may have to be maintained in the worst-case. Alternatively, saving internal memory requires each sub-PU to produce (sPUw+2)×(sPUh+2) of DCTIF based interpolated output which for a 16×16 sub-PU works out to ~25% increase in the interpolation work-load. Hence, it is desirable to avoid this increase in internal memory demand or the increase in gate-count due to 25% increase in interpolation work-load.

Whenever sub-pixel accurate delta-MV is employed by DMVR, each sub-PU can potentially have different sub-pixel phase offsets in the horizontal and vertical directions. Hence, each sub-PU needs to perform independent 2-D separable DCTIF based interpolation. Though this is still well below the worst-case DCTIF-interpolation complexity for all 4×4 bi-predicted sub-PUs as encountered for affine sub-CUs in VVC, the average power requirements in hardware or the average processing requirements in software increase significantly with sub-PU level DCTIF. Also, since BPOF in the presence of DMVR with sub-pixel accurate delta-MV is forced to obtain additional samples outside the sub-PU that are required for the gradient calculation for positions within the sub-PU using some interpolation method (e.g. DCTIF, bilinear interpolation, or nearest integer-grid sample). Performing these interpolations also increase the average power requirements for hardware and the average processing requirements in software. Hence, it is desirable that the need for an increase in average power in hardware or average processing requirements in software can be avoided.

The current invention provides a system and method for addressing/mitigating one or more of the above listed issues by (a) maintaining pre-fetch cache accesses at a level close to what it was without DMVR), (b) avoiding an increased internal memory, (c) reducing the time needed to perform computations. (d) avoiding an increased gate count, (e) avoiding an increased average power in hardware or increase in average processing requirements in software, and (f) avoiding a lack of SIMD-friendliness.

The invention improves concurrency of different processing. In one embodiment, the bilinear motion compensation performed for DMVR is utilized for computing the optical flow vectors at 4×4 block level also. This enables all the flow vector related computations to be performed concurrently with DCTIF-based motion compensation, thus improving the overall timing for motion compensation. In another embodiment, the DCTIF-based motion compensation is performed first with additional samples for refinement computed using bilinear motion compensation. This allows DMVR to be performed in a row-level pipeline as each vertical DCTIF based interpolated line becomes available. The complexity of bilinear interpolation normally performed for the entire refinement range is reduced by sharing the DCTIF based interpolated samples for a central portion, thus reducing gate count in hardware or operations in software. The internal memory requirement is also reduced in this embodiment as the integer grid samples accessed from pre-fetch cache need not be maintained over 2 sub-PU stages.

In embodiments that require DMVR and BPOF to co-exist simultaneously for a coding unit, the sub-pixel accurate delta-MV from DMVR is disabled so that in larger coding units that have been force partitioned into sub-PUs, re-use of horizontally interpolated and vertically interpolated line buffers becomes possible. In software, this allows DCTIF to be performed at a coding unit level to produce (CU_w+4)× (CU_h+4) samples which is less expensive computationally than performing DCTIF at a sub-CU level.

In certain embodiments where sub-pixel accurate delta-MV in DMVR is available. BPOF based correction is replaced by a gradient based correction using the sub-pixel flow vector obtained from DMVR. By computing the sub-pixel flow vector using a parametric error surface obtained using integer-distance cost values, pixel level operations related to flow vector computation are avoided in this case.

In certain embodiments, to improve the overall timing, the flow vector calculations using BDOF are performed without depending on the delta MV from DMVR. A decision logic is introduced to decide whether luma inter prediction will use gradient based correction at the DMVR determined delta MV positions or the correction computed using BDOF based optical flow vectors. The DMVR based delta MVs are used for updating the refined MVs irrespective of the above decision and the same is used for performing chroma MC at sub-PU level.

In coding units where BPOF is applied, but DMVR is not applied, a normative sub-PU size is defined (which is preferably the same as the sub-PU size used in the case of DMVR with BPOF) such that the sample gradients at positions inside the sub-PU that require samples outside the sub-PU are obtained using the same interpolation that is performed for DMVR.

In certain embodiments, the interpolation used for DMVR is adapted based on the coding unit size such that coding unit sizes above a pre-determined threshold for coding unit width, coding unit height, and coding unit size use DCTIF itself over the entire refinement range while the remaining coding units use a simpler interpolation for either the additional samples required for refinement or for the entire refinement range.

Given that decoder side motion vector refinement/derivation is a normative aspect of a coding system, the encoder will also have to perform the same refinement search operation in order to not have any drift between the encoder's reconstruction and the decoder's reconstruction. Hence, all aspects of all embodiments are applicable to both encoding and decoding systems.

In template matching, the refinement movement happens only in the reference starting from the sub-pixel accurate center that is derived based on the explicitly signaled merge index or implicitly through cost evaluations.

In bilateral matching (with or without averaged template), the refinements start in the L0 and L1 references starting from the respective sub-pixel accurate centers that are derived based on the explicitly signaled merge index or implicitly through cost evaluations.

Embodiment 1

In this embodiment, DMVR and 4×4-level bi-predictive optical flow vector determination use the same interpolation scheme. One sample embodiment of this is illustrated in FIG. 6, wherein bilinear interpolation is employed as shown in Block 601, 601 accesses samples from a pre-fetch buffer M601 that is assumed to fetch reference samples using the unrefined motion vectors at a coding tree block level or a virtual pipeline data unit (VPDU) level. The bilinear interpolated samples are stored in internal memory buffer M602 and accessed by processing block 602 that performs integer-distance DMVR with respect to the merge MV centers in L0 and L1 for a given sub-PU to produce an integer distance delta-MV. Block 603 that performs bi-predictive optical flow vector estimation for each 4×4 with the given sub-PU also accesses M602 starting at the offset provided by the integer distance delta-MV for the sub-CU. It should be noted that the common interpolation can also be DCTIF based interpolation. In the case that the common interpolation is not DCTIF based interpolation, FIG. 6 shows the rest of the dependencies. The integer grid samples accessed during the non-DCTIF interpolation is buffered in internal memory M603 to avoid accessing these samples from the pre-fetch cache again. The horizontal interpolation stage of DCTIF (604) produces its output into a line buffer M604. The vertical interpolation stage (605) then consumes from these line buffers to produce a new vertical interpolation line. The horizontal gradients at the left and right boundary of the sub-PU and the vertical gradients at the top and bottom boundary of the sub-PU (after considering the integer distance displacement from DMVR) are buffered in internal memory M605. As each vertically interpolated row of the sub-PU becomes available, gradient based correction is applied by using the computed flow vector for each 4×4 block within the sub-PU in 606. The contents of M605 are used to obtain the gradients of positions within the sub-PU that require samples outside the sub-PU. Using the computed correction, the final bi-predicted sample with correction is produced in 607. The processing of L0 and L1 lines in 604, 605, and 606 are assumed to be performed either concurrently or in an interleaved manner so that 607 can complete a row at a time.

Table 1 illustrates the level of concurrency that this embodiment provides. The major functional blocks are shown across the columns and the different timing related stages are shown on the rows. It can be seen from the table that stages T1, T3, and T6 relate to handling either the ramp-up or ramp-down and hence are much smaller than stages T2, T4, and T5 which handle the steady state for one or more functional blocks. It can be seen that T2 offers concurrency between interpolation for DMVR and the cost calculations for DMVR. T4 offers concurrency between flow vector computation for 4×4 blocks of a sub-PU and the priming of the horizontal DCTIF based interpolation. T5 offers concurrency between the vertical DCTIF based interpolation and applying of the gradient based correction to produce a row of final bi-prediction with correction.

TABLE 1

Concurrency table across the different functional blocks of Embodiment 1

| Stage | Bi-linear MC for refinement | Integer-distance refinement MV determination | Bi-predictive Optical Flow Vetor Estimation | MC using 2-D separable DCTIF | Bi-predictive Averaging with Gradient and Flow based Correction |
|---|---|---|---|---|---|
| T1 | First 5 rows of Bi-linear interpolation output in L0 and L1 | | | | |
| T2 | Next (sPUh-1) rows of Bi-linear interpolation output in L0 and L1 | Row-level DMVR cost update calculations over all search positions for (sPUh-1) rows | | | |
| T3 | | Last row-level DMVR cost update calculations over all search positions + Best integer distance cost determination | | | |

TABLE 1-continued

Concurrency table across the different functional blocks of Embodiment 1

| Stage | Bi-linear MC for refinement | Integer-distance refinement MV determination | Bi-predictive Optical Flow Vetor Estimation | MC using 2-D separable DCTIF | Bi-predictive Averaging with Gradient and Flow based Correction |
|---|---|---|---|---|---|
| T4 | | | Flow vector determination for all 4 × 4 blocks within sub-PU | First 8 (or 7) rows of horizontal DCTIF for sub-PU in L0 and L1 + first row of vertical DCTIF in L0 and L1 | |
| T5 | | | | Horiz DCTIF + Vert DCTIF for (sPUh-1) rows | Done for (sPUh-1) rows |
| T6 | | | | | Done for last row of sPU |

NOTE:
T1, T3, T6 are relatively smaller in timing than T2, T4, T5 stages which allow concurrency across at least 2 functional blocks FIG. 7 illustrates how BPOF is applied to coding units that do not apply DMVR The memory units M701, M702, M703, M704, and M705 are similar in functionality to M601, M602, M603, M604, and M605 respectively. The processing units 701, 702, 703, 704, 705, and 706 are similar in functionality to 601, 603, 604, 605, 606, and 607 respectively. Since DMVR is not performed, the block sizes involved are not dependent on the DMVR refinement range parameter S. However, the same methodology as in the case of DMVR is employed to harmonize the hardware and software implementations across coding units that employ DMVR and do not employ DMVR.

FIG. 8 illustrates how DMVR is performed to coding units that do not employ BPOF. The memory units M801, M802, M803, M804, and M805 are similar in functionality to M601, M602, M603, M604, and M605 respectively. The processing units 801, 802, 804, 805, 806, and 807 are similar in functionality to 601, 602, 604, 605, 606, and 607 respectively. The processing unit 803 differs from 603 in that it computes the sub-pel accurate flow vector for the entire sub-PU using parametric error surface modeled using the integer distance position costs evaluated in 802.

In systems and methods of FIG. 6 and FIG. 8, if sub-pixel accurate delta-MV is available, it is used to update the refined MV for the sub-PU so that the refined MV can be used for spatial MV prediction (in merge or AMVP), for deblocking strength determination, and as temporal motion vector predictor for future access units in encoding order. The sub-pixel delta-MV updated refined MV is also used for chroma motion compensation of the chroma portions corresponding to the luma sub-PU.

The primary advantage of embodiment-1 is to improve concurrency across the different processing stages such that the overall pipeline latency can be reduced in hardware implementations. Specifically, by computing the flow vector using the same interpolation used for DMVR, the computation of flow vector can happen concurrently with DCTIF based interpolation. Similarly, the gradient based correction can be applied concurrently with the production of the DCTIF based interpolation. It also reduces average processing time in software implementations by allowing the motion compensation for refinement and DCTIF based motion compensation to be performed on the entire luma coding unit rather than requiring sub-CU level motion compensation. This is made possible by disabling the sub-pixel accurate delta-MV part for luma. The worst-case pre-fetch cache accesses are kept nearly at the same level as without DMVR and/or BPOF. The coding efficiency impact is kept minimal.

In this embodiment, a system and method for sharing the same interpolation method across DMVR and BPOF vector estimation is disclosed. A system and method for concurrent processing of BPOF vector estimation and DCTIF based interpolation is disclosed. A system and method for reducing software computational complexity by disabling sub-pixel accurate delta-MV for luma, but still using the sub-pixel accurate delta-MV for updating sub-PU refined MV and for chroma MC, is disclosed.

Embodiment 2

In this embodiment, the motion compensation for refinement uses the DCTIF based interpolated samples for the central portion of the refinement range (i.e. for a coding unit size worth of samples corresponding to zero delta-MV) while the additional samples around these central samples that are required for DMVR and BPOF are obtained using either DCTIF or a simpler interpolation scheme. This is illustrated in FIG. 9. Block 901 performs horizontal interpolation by accessing samples from a pre-fetch buffer M901 that is assumed to fetch reference samples using the unrefined motion vectors at a coding tree block level or a virtual pipeline data unit (VPDU) level. The horizontal interpolation produces sub-pixel phase dependent DCTIF based interpolated sPUw number of samples on each row and the left and right three interpolated samples of the row are produced using either DCTIF or a simpler interpolation (such as bilinear interpolation at the same sub-pixel precision or reduced sub-pixel precision, nearest integer grid samples, etc.). These are stored in a line buffer unit M902. The vertical interpolation block 902 accesses from M902 to produce vertically interpolated samples wherein the first and last three rows are produced using DCTIF or a simpler interpolation while the central sPUh number of rows are produced using DCTIF based interpolation based on the sub-pixel phase. These vertically interpolated samples are stored in an internal memory buffer M903. Integer-distance DMVR cost calculations are performed in 904 by accessing M903. It should be noted that row-level cost calculations can be performed as soon as a new row is available for a given search position to reduce the latency of DMVR. When the cost calculation is updated for all rows of all search positions for DMVR, the integer distance delta-MV is determined in 905 by finding the lowest cost among all the positions and using the distance of this position from the search center as the integer-distance delta-MV. Once the integer distance delta-MV is determined, an optional sub-pixel accurate delta-MV can be determined using either explicit evaluation or through parametric error surface based fit applied to integer distance costs determined in 904 and passed to 905. Block 906 accesses M903 to access sample values at integer distance offsets determined in 905 and computes sample gradients required for computing the optical flow vector for each 4×4 block within each sub-PU. Once the optical flow vector for a given 4×4 block with the sub-PU is determined in 906, the block level corrections are computed in 907 by accessing M903 and by using the computed optical flow vector. 906 can re-compute the gradients using the sample values accessed from M903 instead of requiring 906 to store the gradient values. The final bi-prediction samples values are computed in 908 by accessing the sample values in M903 and the correction values passed from 907.

Table 2 illustrates the level of concurrency in this embodiment across the different functional units. The major functional blocks are shown across the columns and the different timing related stages are shown on the rows. It can be seen from the table that stages T2 and T4 allow concurrency.

Specifically, during T2, interpolation and DMVR cost calculations happen concurrently. During T4, optical flow estimation and flow vector and gradient based correction are pipeline on rows of 4×4 blocks. In larger coding units that have multiple sub-PU vertically, by processing sub-PUs in a column-wise manner, 8 horizontally interpolated line buffers and 2 vertically interpolated line buffers can be re-used from the previous sub-PU to avoid the overhead of T1. However, for the worst-case of all 8×8 coding units, T1 stage outputs of one CU cannot be used for another CU. However, stage T1 of one sub-PU/CU and stage T5 of another sub-PU/CU can be made concurrent.

TABLE 2

Concurrency table across the different functional blocks of Embodiment-2

| Stage | Shared MC (2-D separable DCTIF for central + 2-D Bilinear interp for additional) | Integer-distance refinement MV determination | Bi-predictive Optical Flow Vector Estimation | Bi-predictive Averaging with Gradient and Flow based Correction |
|---|---|---|---|---|
| T1 | 2 rows of Bilin MC output + 9 or 10 rows of horizontal DCTIF + 3 rows of vertical DCTIF | | | |
| T2 | Horizontal DCTIF + vertical DCTIF for (sPUh-3) rows + 2 rows of Bilin MC output | Row-level DMVR cost update calculations over all search positions for (sPUh-1) rows | | |
| T3 | | Last row-level DMVR cost update calculations over all search positions + Best integer distance cost determination | | |
| T4 | | | Flow vector determination for a row of 4 × 4 blocks within sub-PU | Gradient and Flow based correction to bi-predictive averaging for a row of 4 × 4 blocks within sub-PU for which flow vector has been estimated |
| T5 | | | | Last row of 4 × 4 blocks processing |

NOTE:
Traversing across sub-PUs within a CU in a column-wise manner, most of T1 work can be hidden between sub-PUs. But, worst-case happens for small CUs (say, 8 × 8) where each 8 × 8 incurs its own T1 stage which can be comparable in timing to T2.

FIG. 10 illustrates how BPOF is applied to coding units that do not apply DMVR. The memory units M1001, M1002, and M1003 are similar in functionality to M901, M902, and M903 respectively. The processing units 1001, 1002, 1006, 1007, and 1008 are similar in functionality to 901, 902, 906, 907, and 908 respectively. Since DMVR is not performed, the block sizes involved are not dependent on the DMVR refinement range parameter S. However, the same methodology as in the case of DMVR is employed to harmonize the hardware and software implementations across coding units that employ DMVR and do not employ DMVR.

FIG. 11 illustrates how DMVR is performed to coding units that do not employ BPOF. The memory units M1101, M1102, and M1103 are similar in functionality to M901, M902, and M903, respectively. The processing units 1101, 1102, 1104, 1105, 1107, and 1108 are similar in functionality to 901, 902, 904, 905, 907, and 908 respectively. The processing unit 1106 differs from 906 in that it computes the sub-pel accurate flow vector for the entire sub-PU using parametric error surface modeled using the integer distance position costs evaluated in 1104 and passed through 1105.

In systems and methods of FIG. 9 and FIG. 11, if sub-pixel accurate delta-MV is available, it is used to update the refined MV for the sub-PU so that the refined MV can be used for spatial MV prediction (in merge or AMVP), for deblocking strength determination, and as temporal motion vector predictor for future access units in encoding order. The sub-pixel delta-MV updated refined MV is also used for chroma motion compensation of the chroma portions corresponding to the luma sub-PU.

The primary advantage of this embodiment is that it reduces the internal memory requirement by not having to maintain the integer grid samples over 2 sub-PU stages. Only the interpolated (sPUw+6)×(sPUh+6) samples per reference are stored which is much smaller than (sPUw+13)×(sPUh+13) for the worst-case of sPUw=8 and sPUh=8. It also reduces the computational complexity by not performing bilinear interpolation for the central samples. The concurrency is also improved by having the ability to perform row-level pipelining between interpolation and DMVR cost computation as well as row of 4×4 level pipelining between flow vector estimation and BPOF based correction. It also reduces average processing time in software implementations by allowing the motion compensation for refinement and DCTIF based motion compensation to be performed on the entire luma coding unit rather than requiring sub-CU level motion compensation. This is made possible by disabling the sub-pixel accurate delta-MV part for luma. The worst-case pre-fetch cache accesses are kept nearly at the same level as without DMVR and/or BPOF. The coding efficiency impact is kept minimal.

In this embodiment, a system and method for modifying the normative motion compensation to use DCTIF for zero delta-MV from DMVR and a simpler interpolation for additional samples required for non-zero delta-MVs and using the same interpolation for DMVR and BPOF is disclosed. A system and method for row-level pipelined processing of DMVR cost calculation with interpolation is disclosed. A system and method for reducing software computational complexity by disabling sub-pixel accurate delta-MV for luma, but still using the sub-pixel accurate delta-MV for updating sub-PU refined MV and for chroma MC, is disclosed.

Embodiment 3

In this embodiment, which is a variant of Embodiment 2, BDOF based optical flow vector estimation for each 4×4 block of samples in each sub-PU within a CU are performed substantially in parallel with DMVR cost evaluations and hence do not depend on the refined motion vector determined by DMVR.

FIG. 12 illustrates this embodiment for a sub-PU of a coding unit block of luma samples. A coding unit block is force partitioned into sub-PUs such that the refinement block size does not exceed a pre-determined width and a pre-determined height. When the coding unit block has width less than or equal to the pre-determined width and height less than or equal to the pre-determined height, it is not force partitioned into smaller blocks and the sub-PU and coding unit block will be the same.

Though horizontal and vertical DCTIF based interpolation blocks 1201 and 1202 are shown, it should be understood that certain blocks may have only horizontal interpolation or only vertical interpolation or just use integer grid samples without requiring any interpolation. In the worst-case when both the horizontal and vertical motion vector components have fractional pixel parts, both horizontal and vertical DCTIF-based interpolation shall be applied. When both interpolations are present, the vertical interpolation and horizontal interpolation can happen in a row-level pipeline.

In block 1203, integer distance position cost evaluations for DMVR are computed using the final interpolated samples. It should be noted that for certain cost functions such as sum of absolute differences or row-mean removed sum of absolute differences, the cost evaluations can happen in a row-level pipeline with interpolation.

In block 1204, based on the costs evaluated at all the refinement delta integer distance motion vector positions from the merge MVs, the best integer distance position is determined. 27, When the best cost integer distance delta motion vector is not at the boundary of the refinement range, a parametric error surface is fitted to the integer distance cost function values at and around the best cost integer distance delta motion vector to obtain the best sub-pixel accurate delta motion vector.

In block 1205, for each 4×4 block of samples within the current sub-PU, an optical flow vector is estimated using the bi-predictive optical flow estimation process described earlier. It should be noted that this optical flow vector estimation does not depend on the determination of the refined MV using DMVR.

In block 1206, a decision is made between whether DMVR refined MV shall be used for producing the final bi-prediction output samples or BDOF optical flow vector shall be used for producing the final bi-prediction output samples. This decision is made in favor of using BDOF vector can be made using one or more of the following rules:

If the best cost integer distance delta motion vector is a zero vector.

If the zero delta motion vector DMVR cost minus the best cost is less than a pre-determined threshold (e.g. for a 16×16 sub-PU, the pre-determined threshold can be 16, 32, or 64 when computing the cost function using 14-bit interpolated samples). In some embodiments, the best cost can be based on only integer distance delta MV. In some other embodiments, the best cost can be based on parametric error surface of integer distance cost function values.

The variance of the Euclidean or Manhattan distance of BPOF vectors across all 4×4 block of luma samples within in a target sub-PU exceed a pre-determined threshold (e.g. for a sub-PU of size 16×16 containing 16 4×4 block of samples, the pre-determined threshold on the variance of the Manhattan distance can be values such as 0.25, 0.4, 0.5, etc.)

In block 1207, based on the decision made in block 1206, the final bi-predicted samples are generated. Specifically, if block 1207 selects DMVR, the L0 and L1 predicted block of samples at the integer distance delta-MV offset are accessed as the predicted samples for the current sub-PU. If the delta MV has a sub-pixel accurate part determined either explicitly or using the parametric error surface, then Eq.1.14 is applied with vx and vy being the sub-pixel part of the delta MV's horizontal and vertical components respectively, and the gradients are computed using the accessed predicted samples. Thus, the bi-prediction at the integer distance delta MV is modified using the sub-pixel delta-MV and the sample gradient differences.

On the other hand, if block 1207 selects BDOF, Eq 1.14 is applied for each 4×4 block of samples within the sub-PU by using the computed optical flow vector for that 4×4 in block 1205.

Irrespective of the decision by 1206, the delta MV from 1204 is used to update the refined MV for the sub-PU which can be used for deblocking, temporal MV prediction, and spatial MV prediction as required.

The refined MV is also used for performing motion compensation for the chrominance components of the sub-PU. In one embodiment, if the decision block 1206 chooses BDOF, the delta-MV is clipped between −1 and 1 in each component before obtaining the refined MV that is used for performing the motion compensation for the chrominance components.

FIG. 13 illustrates the dependency across the different processing blocks. The vertical interpolation (in a 2-D separable interpolation case) follows the horizontal interpolation. For example, if an 8-tap DCTIF is used for interpolation, after 8 horizontally interpolated rows are available, one row of vertical interpolation can happen. After this, one row of horizontal interpolation and one row of vertical interpolation can be interleaved (or can happen concurrently). As soon as a row of interpolated samples are available, the integer distance cost evaluations of block 1204 can start for some positions of the delta MVs to be evaluated by DMVR. Similarly, the gradient calculation and gradient sum calculations for processing block 1205 can start as soon as interpolation samples become available. Hence, processing in 1204 and 1205 can happen in parallel. The decision of block 1206 happens as soon as block 1205 finalizes the refinement MV. The gradient based correction to bi-prediction depends on the decision of block 1206.

All of the above-described procedures can be implemented in an encoder or decoder. For example, a video coding device 400 that can be a decoder or encoder is illustrated in FIG. 14.

The video coding device 400 comprises ingress ports 410 (or input ports 410) and receiver units (Rx) 420 for receiving data; a processor, logic unit, processing circuitry or central processing unit (CPU) 430 to process the data; transmitter units (Tx) 440 and egress ports 450 (or output ports 450) for transmitting the data: and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 may be implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 may comprise a coding module 470 wherein various coding operations, in particular, the above-described procedures can be processes, prepared, or provided. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

DEFINITIONS OF ACRONYMS & GLOSSARIES

DMVR Decoder Side Motion Vector Refinement
SAD Sum of Absolute Differences
MV Motion Vector
BPOF Bi-predictive Optical Flow based per-pixel correction for bi-prediction samples
DCTIF Discrete Cosine transform based interpolation filter used for motion compensated interpolation of reference samples based on a given sub-pixel motion vector with respect to that reference frame for a given block of samples
MC Motion compensation
HEVC High Efficiency Video Coding standard
VVC Versatile Video Coding standard

The invention claimed is:

1. An inter prediction method, comprising:
selecting reference samples based on motion information of a current picture block of a current picture;
deriving first interpolated samples by performing a first interpolation on the selected reference samples;
deriving an integer distance delta motion vector for a target sub-prediction unit (PU) by performing integer-distance motion vector refinement (MVR) based on the first interpolated samples, wherein the target sub-PU is in the current picture block;
deriving M×M pixel matrix flow vectors by performing bi-predictive optical flow (BPOF) for each M×M pixel matrix in the target sub-PU based on the first interpolated samples and the integer distance delta motion vector, wherein M is a positive integer, and a size of M×M pixel matrix is smaller than a size of the target sub-PU;
deriving second interpolated samples by performing a second interpolation on the reference samples;
computing at least one correction parameter for the target sub-PU based on the M×M pixel matrix flow vectors, the first interpolated samples, and the second interpolated samples; and
performing a bi-prediction based on the second interpolated samples and the at least one correction parameter.

2. The method of claim 1, wherein the motion information comprises a motion vector at a coding tree block level or a virtual pipeline data unit level.

3. The method of claim 1, wherein the second interpolation is performed using a motion vector of the current picture block and the integer distance delta motion vector derived for the target sub-PU.

4. The method of claim 1, wherein the at least one correction parameter for the target sub-PU is computed from sample gradients calculated for samples of the target sub-PU.

5. The method of claim 1, wherein performing the bi-prediction comprises generating a first prediction picture using the correction parameter based on a first reference picture L0, and generating a second prediction picture using the correction parameter based on a second reference picture L1.

6. The method of claim 1, wherein integer grid samples of the reference samples are stored in a first memory, and the first interpolated samples are stored in a second memory that is different from the first memory.

7. The method of claim 1, wherein the second interpolation is performed by a separable interpolation filter.

8. The method of claim 1, further comprising:
before computing the at least one correction parameter for the target sub-PU, deriving horizontal boundary sample gradients at left and right boundary sample positions of the target sub-PU and vertical boundary sample gradients at top and bottom boundary sample positions of the target sub-PU based on the first interpolated samples.

9. The method of claim 8, wherein the horizontal boundary sample gradients and the vertical boundary sample gradients are derived after performing the MVR.

10. The method of claim 8, wherein the at least one correction parameter for the target sub-PU is computed based on the horizontal boundary sample gradients and the vertical boundary sample gradients.

11. The method of claim 1, wherein the first interpolation is a bilinear interpolation.

12. The method of claim 1, wherein the second interpolation is a Discrete Cosine transform interpolation.

13. The method of claim 1, wherein M is 4.

14. An encoder, comprising:
one or more processors; and
a non-transitory computer-readable storage medium coupled to the one or more processors and storing programming for execution by the one or more processors, wherein the programming, when executed by the one or more processors, perform operations comprising:
selecting reference samples based on motion information of a current picture block of a current picture;
deriving first interpolated samples by performing a first interpolation on the selected reference samples;
deriving an integer distance delta motion vector for a target sub-prediction unit (PU) by performing integer-distance motion vector refinement (MVR) based on the first interpolated samples, wherein the target sub-PU is in the current picture block;
deriving M×M pixel matrix flow vectors by performing bi-predictive optical flow, (BPOF), for each M×M pixel matrix in the target sub-PU based on the first interpolated samples and the integer distance delta motion vector, wherein M is a positive integer, and the a size of M×M pixel matrix is smaller than the a size of the target sub-PU;
deriving second interpolated samples by performing a second interpolation on the reference samples;
computing at least one correction parameter for the target sub-PU based on the M×M pixel matrix flow vectors, the first interpolated samples, and the second interpolated samples; and
performing a bi-prediction based on the second interpolated samples and the at least one correction parameter.

15. A decoder, comprising:
one or more processors; and
a non-transitory computer-readable storage medium coupled to the one or more processors and storing programming for execution by the one or more processors, wherein the programming, when executed by the one or more processors, performs operations comprising:
selecting reference samples based on motion information of a current picture block of a current picture;
deriving first interpolated samples by performing a first interpolation on the selected reference samples;
deriving an integer distance delta motion vector for a target sub-prediction unit (PU) by performing integer-distance Motion Vector Refinement (MVR) based on the first interpolated samples, wherein the target sub-PU is in the current picture block;
deriving M×M pixel matrix flow vectors by performing bi-predictive optical flow (BPOF) for each M×M pixel matrix in the target sub-PU based on the first interpolated samples and the integer distance delta motion vector, wherein M is a positive integer, and a size of M×M pixel matrix is smaller than a size of the target sub-PU;
deriving second interpolated samples by performing a second interpolation on the reference samples;
computing at least one correction parameter for the target sub-PU based on the M×M pixel matrix flow vectors, the first interpolated samples and the second interpolated samples; and
performing a bi-prediction based on the second interpolated samples and the at least one correction parameter.

16. The decoder of claim 15, wherein the motion information comprises a motion vector at a coding tree block level or a virtual pipeline data unit level.

17. The decoder of claim 15, wherein the second interpolation is performed using a motion vector of the current picture block and the integer distance delta motion vector derived for the target sub-PU.

18. The decoder of claim 15, wherein the at least one correction parameter for the target sub-PU is computed from sample gradients calculated for samples of the target sub-PU.

19. The decoder of claim 15, wherein performing the bi-prediction comprises generating a first prediction picture using the correction parameter based on a first reference picture L0, and generating a second prediction picture using the correction parameter based on a second reference picture L1.

20. The decoder of claim 15, wherein integer grid samples of the reference samples are stored in a first memory, and the first interpolated samples are stored in a second memory that is different from the first memory.

* * * * *

UNITED STATES PATENT AND TRADEMARK OFFICE
CERTIFICATE OF CORRECTION

PATENT NO. : 11,490,096 B2  
APPLICATION NO. : 17/308311  
DATED : November 1, 2022  
INVENTOR(S) : Sriram Sethuraman, Jeeva Raj A and Sagar Kotecha It is certified that error appears in the above-identified patent and that said Letters Patent is hereby corrected as shown below:

On the Title Page

Column 2 (Other Publications)/Line 4 - Delete "(JVE 1)" and insert -- (JVET) --.

In the Claims

Column 25/Line 26 - In Claim 14, delete "the a" and insert -- a --.

Column 25/Line 26 - In Claim 14, delete "the a" and insert -- a --.

Signed and Sealed this  
Twelfth Day of September, 2023

Katherine Kelly Vidal  
*Director of the United States Patent and Trademark Office*